(12) United States Patent
Kerning et al.

(10) Patent No.: US 10,445,959 B2
(45) Date of Patent: Oct. 15, 2019

(54) SECURITY AND PUBLIC SAFETY APPLICATION FOR A MOBILE DEVICE WITH AUDIO/VIDEO ANALYTICS AND ACCESS CONTROL AUTHENTICATION

(71) Applicants: Dan Kerning, Rockville Centre, NY (US); Dharmesh Patel, North Brunswick, NJ (US)

(72) Inventors: Dan Kerning, Rockville Centre, NY (US); Dharmesh Patel, North Brunswick, NJ (US)

( * ) Notice: Subject to any disclaimer, the term of this patent is extended or adjusted under 35 U.S.C. 154(b) by 0 days.

(21) Appl. No.: 16/128,619

(22) Filed: Sep. 12, 2018

(65) Prior Publication Data
US 2019/0108701 A1   Apr. 11, 2019

Related U.S. Application Data

(63) Continuation of application No. 15/911,480, filed on Mar. 5, 2018, now Pat. No. 10,083,558, which is a
(Continued)

(51) Int. Cl.
*G07C 9/00* (2006.01)
*H04W 4/02* (2018.01)
(Continued)

(52) U.S. Cl.
CPC ..... *G07C 9/00158* (2013.01); *G07C 9/00142* (2013.01); *G07C 9/00563* (2013.01);
(Continued)

(58) Field of Classification Search
CPC .......... G06F 21/32; G06F 21/83; G06F 21/34; G06F 21/35; G06F 21/31; G06F 21/36;
(Continued)

(56) References Cited

U.S. PATENT DOCUMENTS

| 7,177,623 | B2 | 2/2007 | Baldwin |
| 7,233,781 | B2 | 6/2007 | Hunter |

(Continued)

*Primary Examiner* — Mark S Blouin
(74) *Attorney, Agent, or Firm* — Thomas A O'Rourke; Bodner & O'Rourke, LLP

(57) ABSTRACT

An access control system utilizes authorized users' mobile electronic devices for transmitting biometric identifiers in combination with using an access card, for authenticating the user's access privileges for unlocking a secure door. The system may further verity proximity of the user's device to the access control reader, which verities correspondence of the access card with the transmitted biometric characteristics. The system may further require entry of a PIN into the user's device, for its transmission to the access control system for access confirmation. A scanner scans the area around its geographic location for signals emitted by mobile electronic devices, and identities a position, a type, and an address of each device, using characteristics of the signals. Audio analytics detect-identify a position of sudden sound fluctuations indicating a gunshot/fight incident, and correlates the incident location to a device location. Video analytics correlate imaged people with detected electronic devices.

2 Claims, 34 Drawing Sheets

Related U.S. Application Data continuation of application No. 15/710,858, filed on Sep. 21, 2017, now Pat. No. 9,922,477, which is a continuation of application No. 15/400,155, filed on Jan. 6, 2017, now Pat. No. 9,773,364, which is a continuation-in-part of application No. 15/277,115, filed on Sep. 27, 2016, now Pat. No. 9,883,370, which is a continuation-in-part of application No. 14/810,581, filed on Jul. 28, 2015, now Pat. No. 9,454,889.

(60) Provisional application No. 62/029,680, filed on Jul. 28, 2014.

(51) Int. Cl.
| | |
|---|---|
| *H04W 4/12* | (2009.01) |
| *H04W 4/14* | (2009.01) |
| *H04W 4/90* | (2018.01) |
| *G08B 21/22* | (2006.01) |
| *G08B 25/00* | (2006.01) |
| *G08B 25/01* | (2006.01) |
| *G08B 27/00* | (2006.01) |
| *H04L 29/06* | (2006.01) |
| *H04W 12/06* | (2009.01) |
| *H04W 12/08* | (2009.01) |

(52) U.S. Cl.
CPC ........... *G08B 21/22* (2013.01); *G08B 25/016* (2013.01); *G08B 27/006* (2013.01); *H04L 63/102* (2013.01); *H04W 4/02* (2013.01); *H04W 4/026* (2013.01); *H04W 4/12* (2013.01); *H04W 4/14* (2013.01); *H04W 4/90* (2018.02); *H04W 12/06* (2013.01); *H04W 12/08* (2013.01); *G08B 25/008* (2013.01); *H04L 63/0861* (2013.01); *H04M 2203/553* (2013.01); *H04M 2250/10* (2013.01)

(58) Field of Classification Search
CPC ..... G06F 2221/2101; G06F 2221/2111; G06F 21/43
USPC ....................................................... 340/5.52
See application file for complete search history.

(56) References Cited

U.S. PATENT DOCUMENTS

| | | |
|---|---|---|
| 7,259,694 B2 | 8/2007 | Myllymaki |
| 7,308,246 B2 | 12/2007 | Yamazaki |
| 7,315,735 B2 | 1/2008 | Graham |
| 7,355,507 B2 | 4/2008 | Binning |
| 7,411,493 B2 * | 8/2008 | Smith ..................... H04W 4/02 340/539.11 |
| 8,219,110 B1 * | 7/2012 | White ..................... H04W 4/02 340/988 |
| 8,624,727 B2 | 1/2014 | Saigh |
| 8,680,991 B2 * | 3/2014 | Tran ................... G06F 19/3418 340/540 |
| 8,723,679 B2 | 5/2014 | Whisenant |
| 8,942,727 B1 | 1/2015 | Roman |
| 2003/0050039 A1 | 3/2003 | Baba |
| 2007/0072581 A1 | 3/2007 | Aerrabotu |
| 2007/0182548 A1 | 8/2007 | Raad |
| 2008/0070546 A1 | 3/2008 | Lee |
| 2008/0133930 A1 | 6/2008 | Moshir |
| 2008/0280633 A1 | 11/2008 | Agiv |
| 2011/0183655 A1 | 7/2011 | Cao |
| 2013/0040600 A1 | 2/2013 | Reitnour |
| 2013/0086109 A1 | 4/2013 | Huang |
| 2015/0365796 A1 | 12/2015 | Toni |

\* cited by examiner

SECURITY AND PUBLIC SAFETY APPLICATION FOR A MOBILE DEVICE WITH AUDIO/VIDEO ANALYTICS AND ACCESS CONTROL AUTHENTICATION

CROSS REFERENCE TO RELATED APPLICATIONS

This application is a continuation of U.S. application Ser. No. 15/710,858, filed on Sep. 21, 2017, which is a continuation of U.S. application Ser. No. 15/400,155, filed on Jan. 6, 2017, which is a continuation-in-part of U.S. application Ser. No. 15/277,115, filed on Sep. 27, 2016, which is a continuation-in-part of U.S. application Ser. No. 14/810,581, filed on Jul. 28, 2015, now issued as U.S. Pat. No. 9,454,889, which claims priority on U.S. Provisional Application Ser. No. 62/029,680. filed on Jul. 28, 2014, all disclosures of which are incorporated herein by reference.

FIELD OF THE INVENTION

The present invention relates to improvements in security and public safety systems, and more particularly to a platform of mobile solutions that are devised to improve an individual's ability to be warned/informed and to warn others of hazards or events, and to request assistance that may be provided in many different forms.

BACKGROUND OF THE INVENTION

Mobile applications ("Apps") for a user's smart phone or other mobile computing devices (e.g., iPad, Kindle, etc.), have gained popularity, particularly with millennials, who tend to be more technology savvy, and exhibit a greater willingness to improve their lives through the use of new programs and devices. For example, there are a number of Apps related to personal security and safety that are available for the iPhone, and some for Android as well, many of which are geared to college students. Some of these include: Bsafe, Guardly, Watch Over Me, StaySafe, OnWatch, and Circle of 6. Each of these Apps provide some narrow safety enhancing functionality, which typically is directed to alerting family members and/or friends about a perceived threat or an ongoing unsafe situation. Some of these Apps include GPS tracking and transmitting of the user's location, and others include automatic sending of emergency notifications if the cell phone user fails to reach their entered destination within the allotted time period.

The next-generation platform of the present invention may incorporate similar functionality, but is further adapted to include many other features that contribute to the user's safety and situational awareness, and the ability to better interact in the community to further contribute to such safety and security for themselves and tor others as well.

SUMMARY OF THE INVENTION

The present invention may be in the form of a mobile web application or a device specific native application that is directed to enhancing public safety and security, through the use of a plurality of different modules, many of which can be easily modified and customized for customer specific applications.

The array of functionality offered by the application may include the following, at an upper level of its functional hierarchy:

GPS Location-based Monitoring of a Police Scanner;
User Chat by Location;
Provision of Crime Data, based on GPS location and preferences;
A Bulletin Alert Module to provide a scrolling list of relevant information that the client desires to push to the user, or the user desires to receive;
A Track Me Module with a Trip Duration Timer that sounds an alarm if not disarmed by passcode or biometric means within the allotted time;
A Blue-Phone-in-Pocket (bPip) module;
A panic button configured to send an instant message with minimal user input that may be customized;
An incident Reporting Module;
A Person of Interest Tracker that permits the user to identify a specific person in a picture or video by drawing an outline around them, which can be sent to the main system which then can be imported into other third party systems;
An I.D. Verification Module;
A mobile profiler that permits the user to create a composite image that represents an individual they are trying to describe;
A Drone Assist Module usable during live pursuit for the tracking of individuals, by harvesting information broadcast by their mobile device, and with continuous tracking capability over varying geographical configurations through hand-off of information to one or more drones;
Accessibility of functionality using Google Glass;
Wearable devices such as a security vest that may be coupled to the App to communicate critical data to a control center, such as the transmission of the person's vital signs (heart rate, reparation rate, etc.) and impact data;
A Bail Check-In Module where bail is conditioned upon the suspect using the App. to periodically check in and respond to random check-in requests;
A Backend Engine;
A multi-functional pre-processing information module, which includes transcoding of video and audio, originally captured for storing high resolution copy, to a high efficiency format for uploading of the data; and
A fan experience module.

DETAILED DESCRIPTION OF THE INVENTION

As used throughout this specification, the word "may" is used in a permissive sense (i.e., meaning having the potential to), rather than the mandatory sense (i.e., meaning must).

Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this documents are incorporated herein in their entirety by reference.

Furthermore, the described features, advantages, and characteristics of any particular embodiment disclosed herein, may be combined in any suitable manner with any of the other embodiments disclosed herein.

Figure 1:
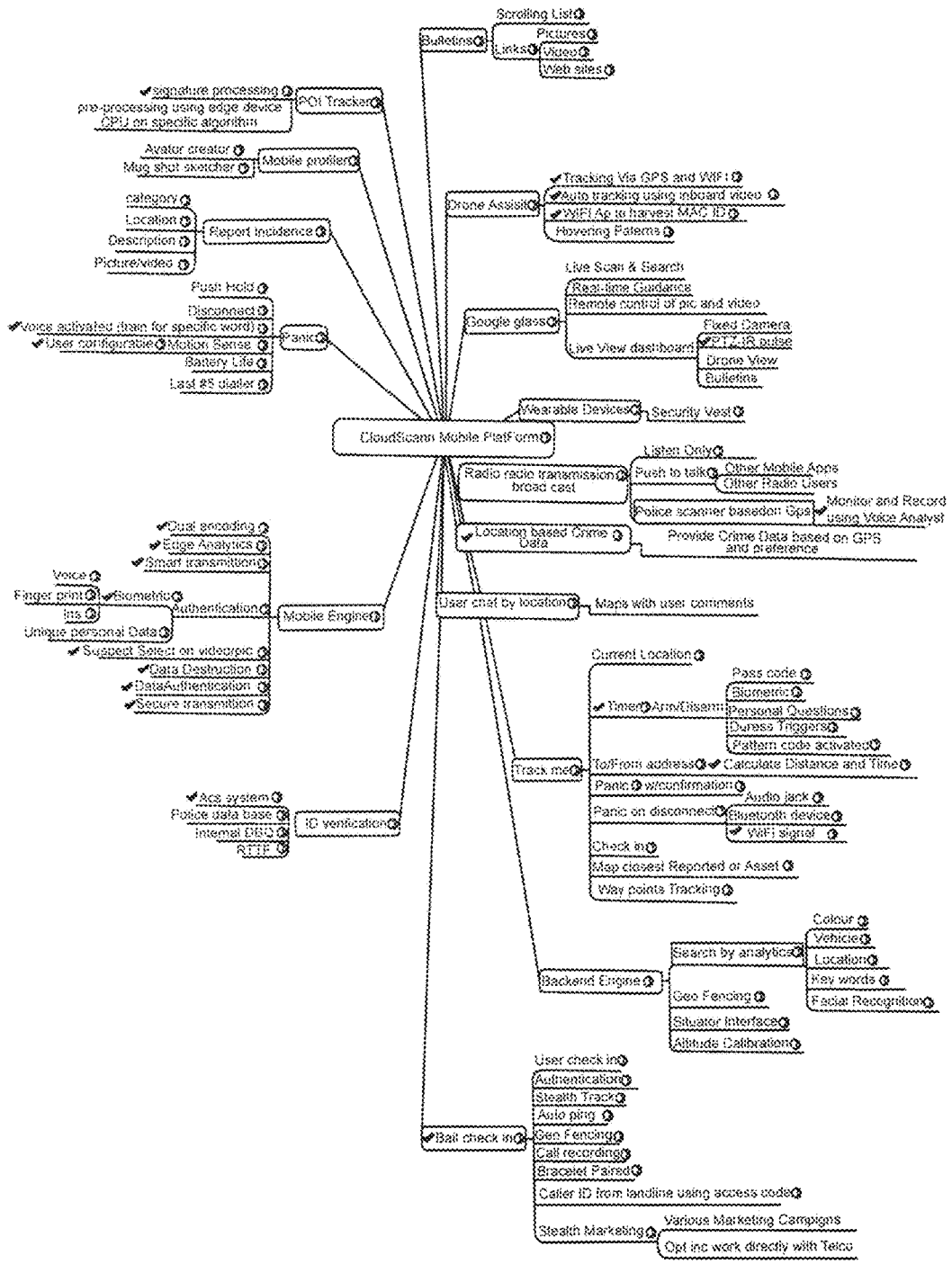
FIG. 1 is a graphical illustration of the various functionality offered by the next generation security and public safety platform of the present invention.
Figure 2:
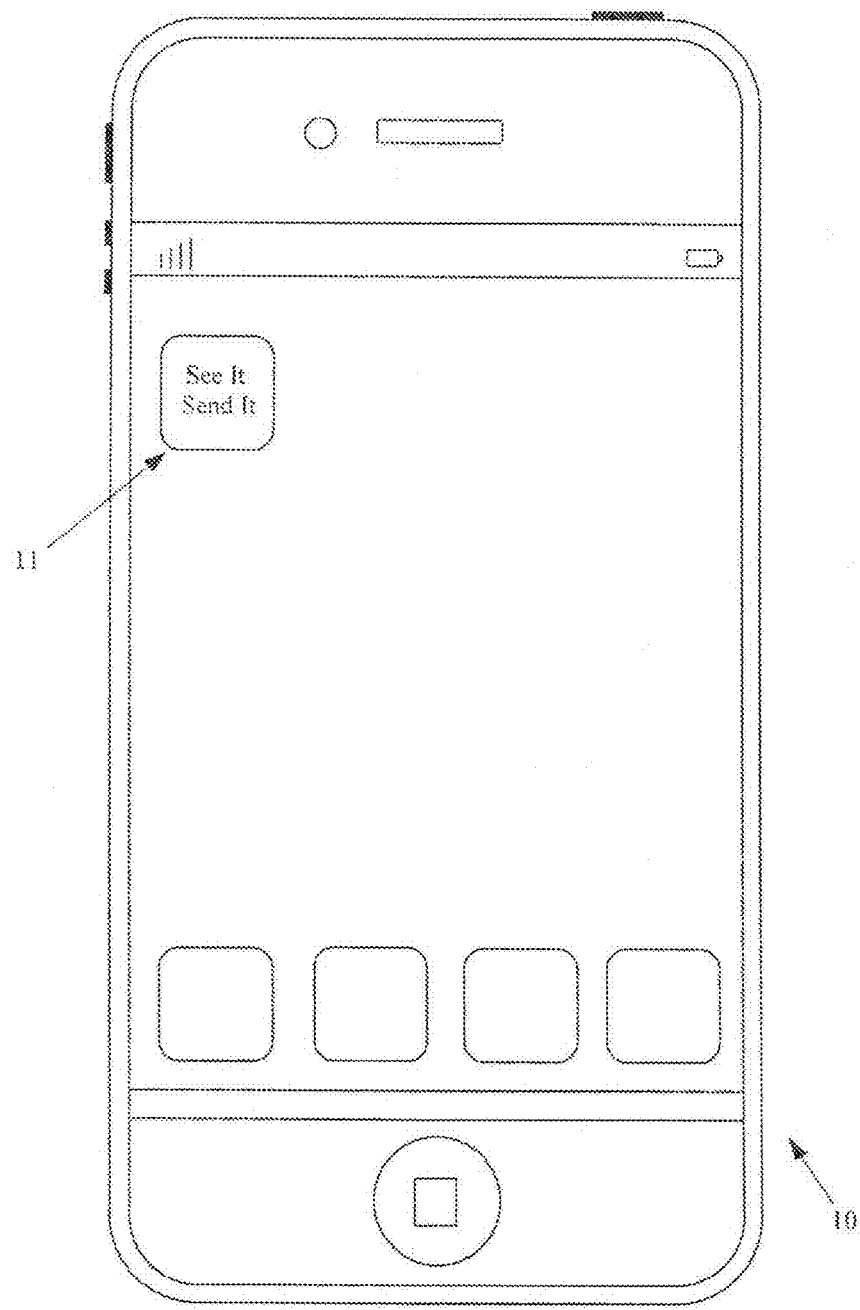
FIG. 2 illustrates the icon that may be used to launch the App of the present invention, as it appears on the display of an exemplary smart phone.

The platform of the present invention can be easily modified and customized for customer specific applications, and may be in the form of a mobile web application or a device specific native application. As used on a client device, such as the exemplary smart phone 10 shown in FIG. 2, the functionality of the platform 11 (see FIG. 1) may be accessed by tapping on the corresponding icon, which is the application ("App") icon labeled therein as "See It—Send It." Accessing the platform through the icon may result in the display of function buttons, as seen for the smart phone of FIG. 3. The array of functionality offered by the platform may include the following, at an upper level of its functional hierarchy:

GPS Location-based Monitoring of a Police Scanner;
User Chat by Location;
Provision of Crime Data, based on GPS location and preferences;
A Bulletin Alert Module to provide a scrolling list of relevant information that the client desires to push to the user, or the user desires to receive;
A Track Me Module with a Trip Duration Timer that sounds an alarm if not disarmed by passcode or biometric means within the allotted time;
A Blue-Phone-in-Pocket (bPip) module;
A panic button configured to send an instant message with minimal user input that may be customized;
An Incident Reporting Module;
A Person of Interest Tracker that permits the user to identify a specific person in a picture or video by drawing an outline around them, which can be sent to the main system which then can be imported into other third party systems;
An I.D. Verification Module;
A mobile profiler that permits the user to create a composite image that represents an individual they are trying to describe;
A Drone Assist Module usable during live pursuit for the tracking of individuals, by harvesting information broadcast by their mobile device, and with continuous tracking capability over varying geographical configurations through hand-off of information to one or more drones;
Accessibility of functionality using Google Glass;
Wearable devices such as a security vest that may be coupled to the App to communicate critical data to a control center, such as the transmission of the person's vital signs (heart rate, respiration rate, etc.) and impact data;
A Bail Check-In Module where bail is conditioned upon the suspect using the App. to periodically check in and respond to random check-in requests;
A Backend Engine;
A multi-functional pre-processing information module, which includes transcoding of video and audio, originally captured for storing high resolution copy, to a high efficiency format for uploading of the data; and
A fan experience module.

Each of the above modules of functionality offered by the platform of the present invention are discussed in detail hereinafter.

Figure 4:
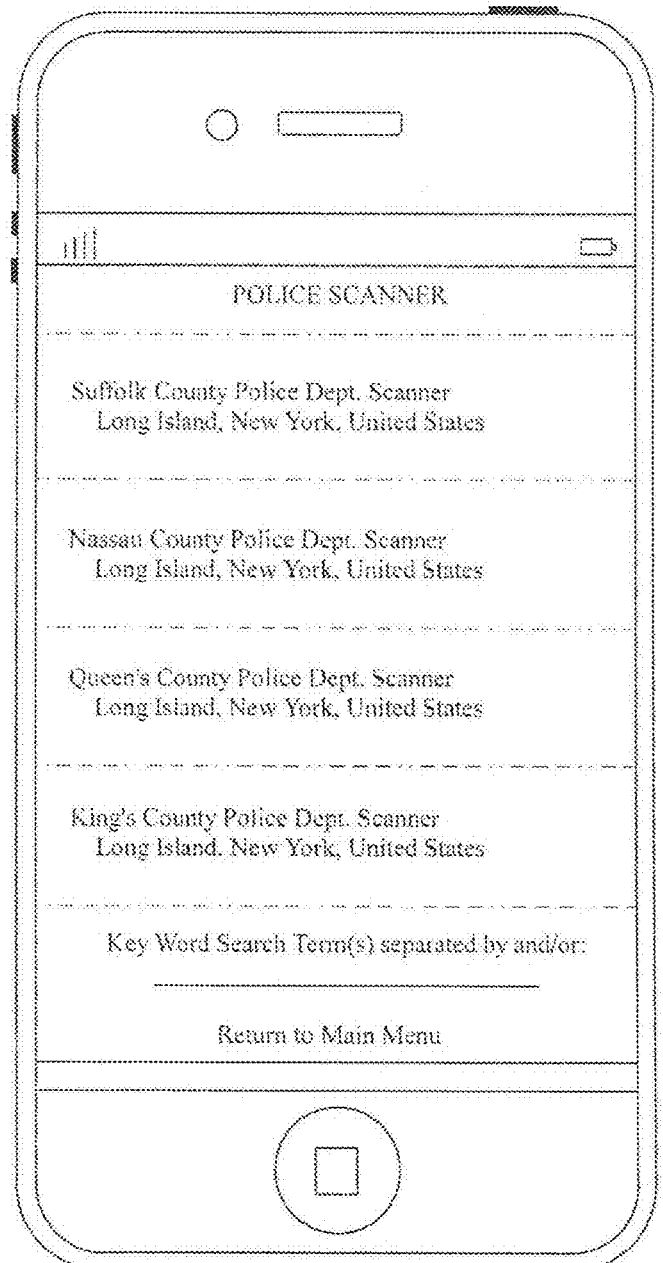
FIG. 4 illustrates the smart phone of FIG. 3, showing one of the screens of the Police Scanner module, in which the user may monitor one of the frequencies used by the local police department.
Figure 5:
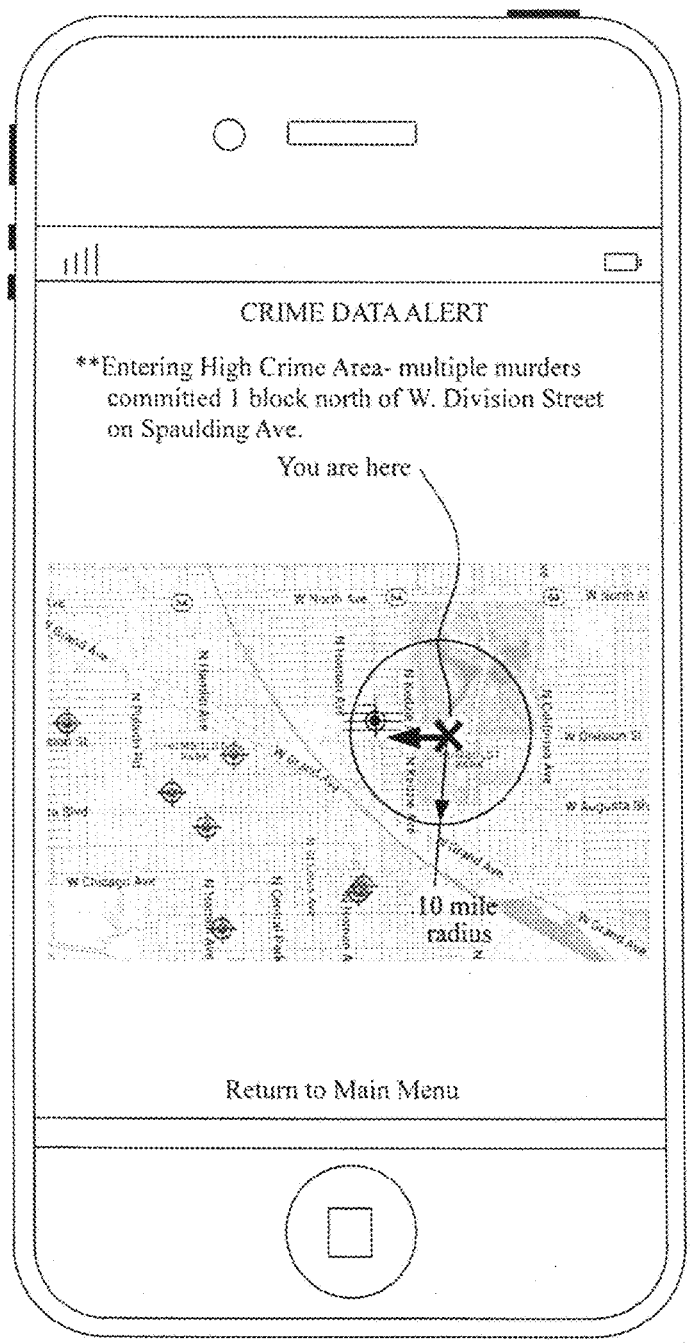
FIG. 5 illustrates the smart phone of FIG. 3, showing one of the screens of the Crime Data module, in which the user is alerted of being within a threshold distance of a high crime area.

The client device of the user that may provide the above functionality of the App may communicate with server system 264 that may provide task management and device tracking functionality, and which can be deployed at one or more data centers in one or more geographic locations GPS Location-Based Monitoring of the Police Scanner:

This module of the platform is configured to harvest radio transmissions and information in the same manner as a police scanner. The module may auto associate the mobile user's location with the local police band broadcast, and may therefore be constructed to provide the user with the capability to only listen, by listening to the radio broadcasts on those specific frequencies, as shown in FIG. 4.

Alternatively, the module may also include a push-to-talk feature, which may utilize the voice capability of the mobile device to thereby allow the user to participate in conversations with other mobile users of the App. The programming of the application may emulate push-to-talk functionality over the cell network for each of the participating App users. Such conversations may be based on the user's GPS location, and may be limited to a radial distance therefrom, so that the user may be able to monitor, for example, the reports being made by the police officers dispatched to a highway accident that has caused a traffic back-up stretching a great distance. Users responding to similar incidents may also be grouped together. Therefore, drivers who may have no visual contact with the accident scene, but wish to be apprised of its severity and any movement of the accident vehicles, which might suggest that traffic will soon begin to proceed normally, may use the functionality to contact other users who may be in close proximity to the accident. This push-to-talk feature may also be configured to interface with conventional radio communications (e.g., short wave radio). These conventional radio communications may be captured by a receiver, and be processed over a server, for re-encoding the audio for transmission over the cell network to the mobile device of the user(s).

In addition, the police scanner module may be configured to run audio analytics. The server may be receiving and recording each of the police band channels, and may thereby be capable of picking out and identifying key words that are spoken on the local channel, and which would be in proximity to the user of the App. For example, as seen in FIG. 4, the user may have an interest in any reports about their car that may have been stolen, and may thus enter the words "stolen vehicle," or "stolen" and "vehicle." The user may utilize the App to be apprised of any progress with respect to any event of interest to them. It may also be very beneficial for a community at large, such as where there may be on-going criminal activity like the pursuit of the Boston Marathon bombers throughout the surrounding area, or where first responders may be on scene, as in the case of a natural disaster (e.g., hurricanes, volcanic eruption) or other disaster (e.g., 911, a commercial airplane crash, etc.).

User Chat by Location

An extension of the above functionality is provided by the ability to generally engage in localized chat with other such users who are in proximity to that App user's mobile device. The module may provide settings permitting adjustment to the maximum distance away that such other users may be distant therefrom, to be able to participate in the conversation. The threshold distance may be set according to the user's preferences, which may vary from time to time according to the particular situation or need. The module may determine which other App users are within the maximum distance. The module may also provide an interactive map showing the other users of the App, and the positioning thereon of their mobile device through the use of respective icons. The conversations may be textual or oral. Where textual conversations occur, they may be delineated on the map. and may be associated to the other App user's icon, using speech bubbles, so that the user can see all of the comments, and location where the person making the comments was positioned on the map at that time.

Provision of Crime Data, Based on GPS Location and Preferences:

This module may also be configured to provide access into one or more crime databases. The information in the crime database(s) may be sorted by location. The user of this functionality may request crime statistics and other data for his/her current location. In addition, the user may set his/her. preferences so that the module will use the data to dynamically alert the user of the threat level at the location that he/she is currently occupying, based on the local crime statistics. For example, if the person is walking throughout the city of Chicago, and approaches or enters within a threshold distance (e.g., 0.10 miles) of an area in which there tends to be a greater prevalence of crime (each category of which may be delineated on the map), the module may periodically send a text notification to the device while the person remains in the higher threat level areas. The user may adjust their personal preferences to change the threshold distance to be a value other than the default of one-tenth of a mile. The text notification may be accompanied by an aural alarm, and/or a vibration alert to ensure that the person is positively notified of the potentially hostile surroundings, so that they may be more vigilant.

This may serve to aid a tourist to the city, who is unfamiliar with the various neighborhoods. The module may also contain databases for cities in other countries, which may assist travelers who are on vacation abroad to help them remain safe while exploring among people who may not even speak the same language.

A Bulletin Alert Module:

A bulletin alert module may be used to supplement the information that may already be received by the user of the mobile device, particularly from the crime data base. The Bulletin module may alert the user as to any information or situations that that the client wants to push to the user. The bulletins may be in the form of a scrolling list presented at the top of the mobile App, which may be displayed at all times while the user is using the application on their device.

Links may be provided within the bulletins to permit the user to drill down into the information presented therein. The links may be configured to display the following information:

Pictures—such as for missing persons or wanted person.
Video—such as a news video clip or informational video with details of a message.
Website links—such as links to external sites for additional information.

"Track Me" Module with a Trip Duration Timer

This module may allow the App user to be tracked for a specific amount of time and for a specific route. If the user exceeds the time/distance parameters, then the device will set off a panic alarm.

Figure 3:
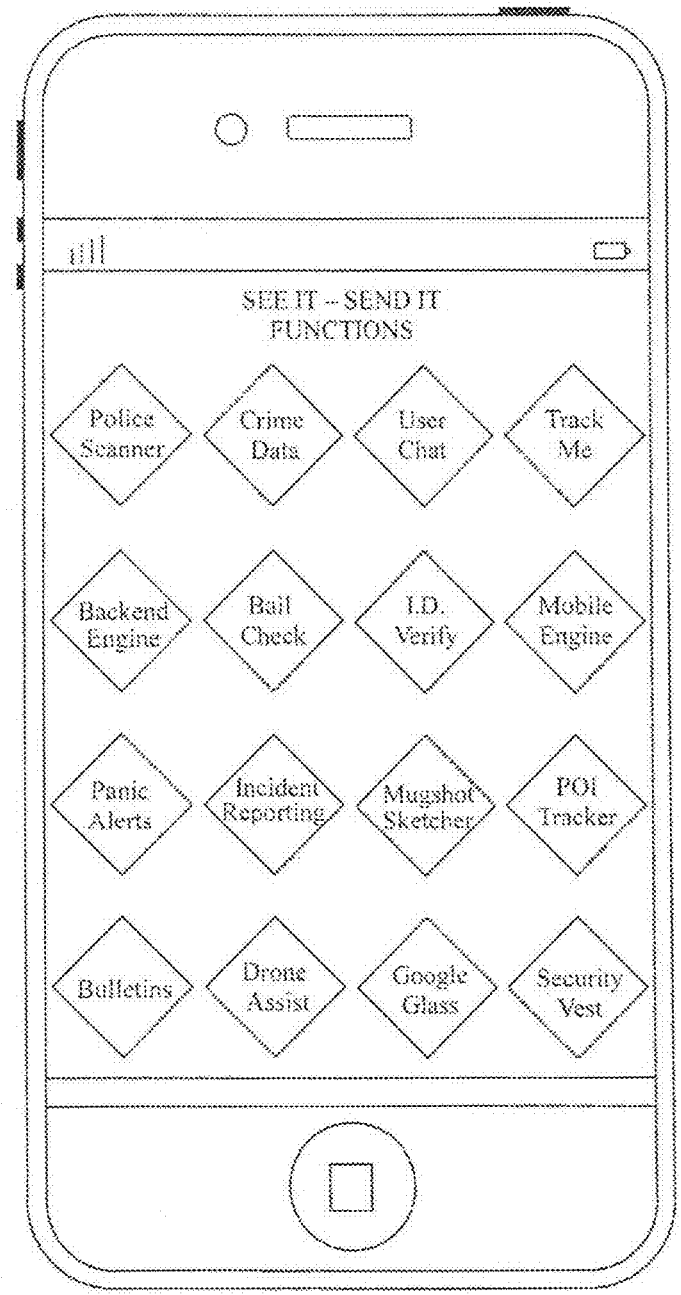
FIG. 3 illustrates the smart phone of FIG. 2, and the function buttons available to the user after selecting the icon of FIG. 1 to launch the App of the present invention.
Figure 6:
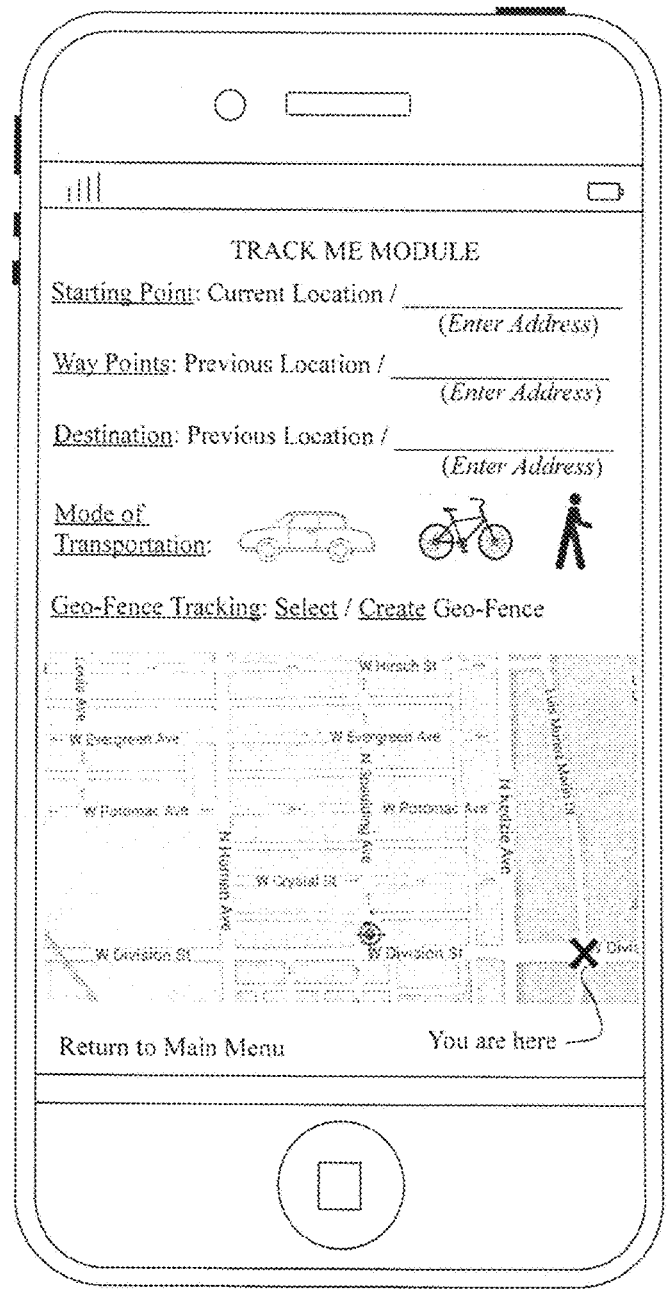
FIG. 6 illustrates the smart phone of FIG. 3, showing a first screen of the "Track Me Module," which permits the user to enter a starting point and a destination for a trip.
Figure 7:
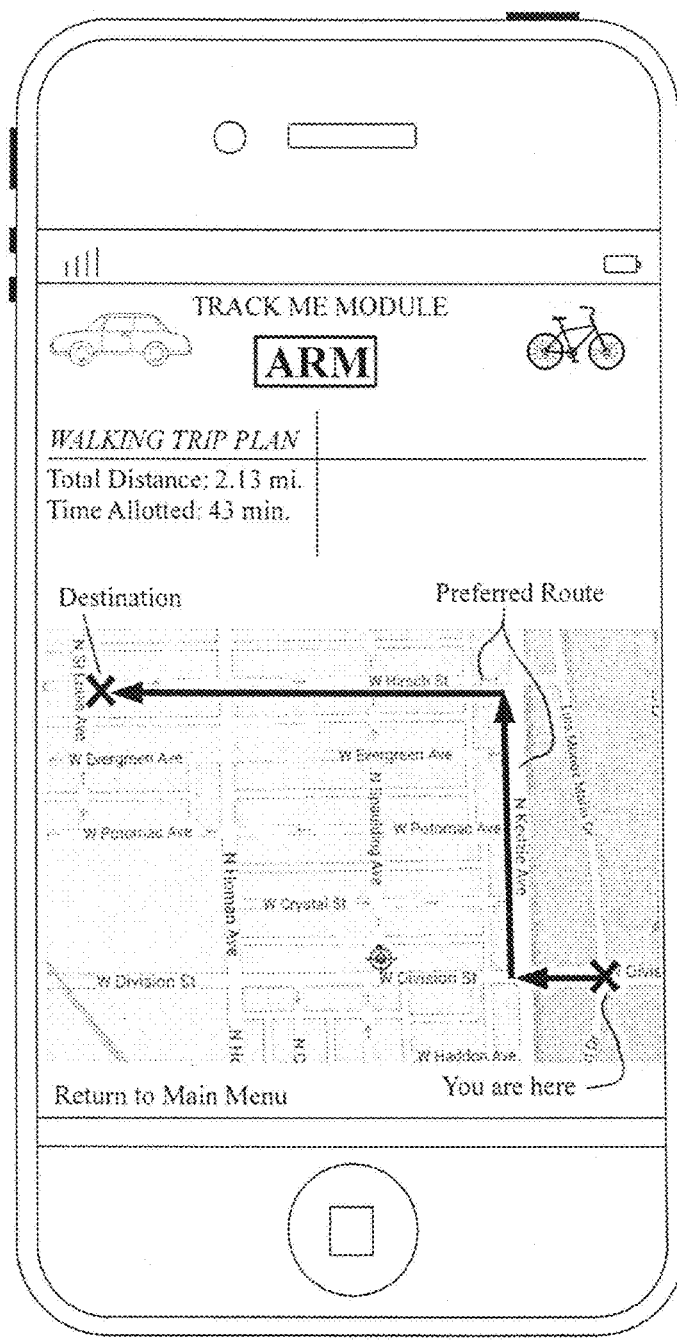
FIG. 7 illustrates the smart phone of FIG. 6, showing a second screen of the "Track Me Module," after the user has entered a starting point and a destination for the trip, and is being prompted to arm the feature to begin the trip.

To initiate the functionality, the App user may first tap on the "Track Me" Module button shown in FIG. 3, which may result in the display of the screen shown in FIG. 6. The screen may permit the entering by the user of a starting point and a destination for the trip. The module may utilize the person's current location for the starting point of the trip by selecting "Current Location," as the current location of the user's device is generally always known. The user may also key in a starting address, which may be different that his/her current location, because the user may anticipate beginning a walking trip, perhaps after getting off of some form of public transportation. The App user may prefer to immediately begin walking, and not loiter at the stop to enter the address, after the bus/train/car leaves the area. The destination address may also be entered, or it may be retrieved from the user's history, by selecting "Previous Location." Once the starting point for the trip and the destination have been identified, the user may select the mode of transportation, by choosing the car icon, the bike icon, or the hiker icon, after which the screen may change to be as shown in FIG. 7. The user in this example may have chosen the current location as the starting point, and the corner of Hirsh Street and North St. Louis Ave as the destination, and may have selected the hiker icon because they intend to walk to the destination. The car icon and the bike icon may still be displayed in the screen of FIG. 7, to give the user the option to change the mode of transportation, which would recalculate the allocated walking time to instead be the corresponding driving time, according to the remaining distance (e.g., where the person may have made an unplanned stop that required a large amount of time, and the person may decide to take a bus instead of walking the remaining distance).

The module may identify a preferred route, which may be based on distance and safety (i.e., based on crime rates in the relevant areas), as well as the total distance of the route and an allotted time for the walk. The module may provide user controls to "arm" and "disarm" the panic notifications associated with the trip parameters. When the user begins the trip, he/she may arm the feature, and their progress will be monitored, both as to the distance covered and the elapsed time.

There are several different methods that may be used for arming/disarming of this feature. For example, the "Arm" button displayed in the screen of FIG. 7 may just be toggled to trigger the tracking function and start the timer. However, to prevent inadvertent arming, or prank usage of this feature by someone other than the owner of the mobile device, the module may require a passcode to be entered after toggling the arm button. The passcode may be the same passcode as the security code for the user's phone. Alternatively, since the user may already have the mobile device password protected to prevent its unauthorized use, a different password may be customized/entered for each individual trip made by the user, by assigning the passcode at the time of arming. After hitting the "arm" button in FIG. 1, the system may prompt the user for the passcode. A biometric recognition means for arming the feature may alternatively be used. The alarm can be armed/disarmed using a fingerprint, iris scan, retina scan, facial scan, blood type or any other biometric signature that may be a feature that is available on the device.

Alternatively, arming of the feature may occur by successfully answering a personal question presented to the user after the "arm" button is toggled, which may serve to verify the identity of the user. The questions can be randomly retrieved from a predefined library of questions.

A pattern code may alternatively be used for arming the feature, by imparting movement to either the mobile device or an extended feature of the device, such as a Bluetooth connected bracelet, in a pro-determined pattern, which may be measured by accelerometers.

Figure 8:
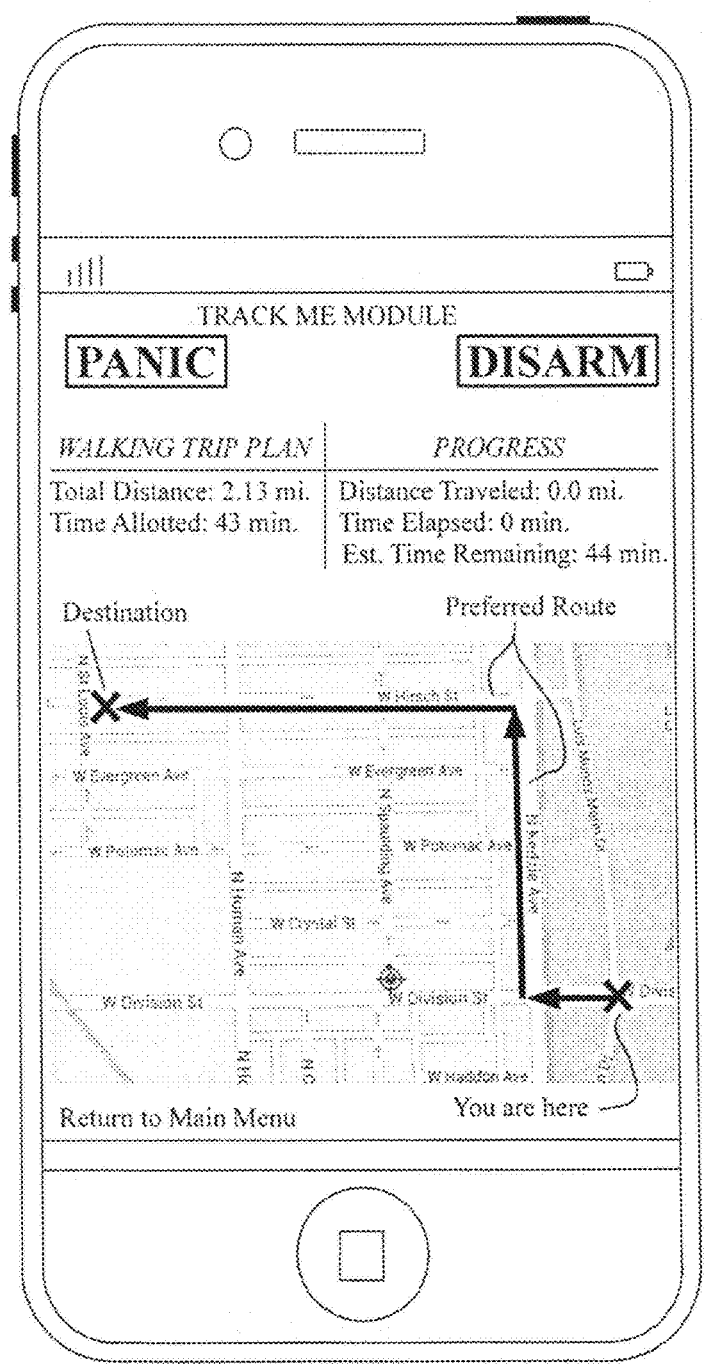
FIG. 8 illustrates the smart phone of FIG. 7, showing a third screen of the "Track Me Module," after the user had entered a starting point and a destination for the trip, and had armed the feature to begin tracking.

Once the starting point and destination have been entered, and the feature is properly armed, it may automatically track and display the distances traveled and the elapsed time, as shown in FIG. 8. The module may display the travelers progress on the map in real time, and may also calculate an estimated time remaining (or an arrival time), based on the speed of travel. As seen in FIG. 8, if the user arms the feature but does not begin to walk immediately, or initially walks very slowly, the estimated time remaining (e.g., 44 minutes) may be greater than the time that was originally allotted for the trip (e.g., 43 minutes). The allotted travel time mas be determined by the method of travel, i.e., walking, bicycle, train, or car, and it may also account for rush hour travel times, changing traffic patterns, weather, etc.

In the case of an unforeseen delay or divergence from the preferred route by the traveler (e.g., stopping to buy a cup of coffee), the system may send a message with a proposed alternate route, and/or a recalculated transit time. However, the system will need this change to be authorized and authenticated by the user before it can be made to the current trip, in order to determine if a valid detour is being initiated by the traveler, or if a kidnapping or other malicious activity is instead occurring. To authorize the change, the system may require the person to complete the same procedure for arming of this feature, as had been done at the start of the trip.

Another feature of the module is that it may require the traveler to check in periodically, to prevent the traveler from being accosted by one person, while another person continues to carry the traveler's device along the route displayed thereon to simulate safe progress, which would delay the sending of an alert that might otherwise provide assistance. In addition, or alternatively, the system may randomly send a message to the traveler to request authentication as to the holder of the device. Moreover, if the user is traveling too slowly, and will likely exceed the allotted time, the system may send a message requesting the person to authenticate that the extra time is needed, and that it was not due to an encounter that was perceived as potentially being risky and required extra caution on the part of the traveler.

For the scenario where the traveler knows in advance that he/she will be making one or more pre-planned stops at a location between the starting point and the destination, those stops may be entered as waypoints before the trip begins. As seen in FIG. 6, a provision may be made to enter the waypoints, similar to the entry of the starting point and the destination, so that the traveler can plan the entire day. Once the user enters the first way point, an option may be provided to enter another way point, so that as many intermediate was points may be entered as are necessary. As noted hereinabove, any variation from the preferred route between the starting point, the way points, and the destination, would require authentication and authorization for the re-routing.

Once the traveler has reached the destination, a couple different options may be used for disarming of the tracker. First, a settings option may be selected by the user so that disarming automatically occurs upon reaching the destination. However, to provide an added layer of security, a settings option may be selected so that he/she must signal the end of the tracking session, by manually disarming the feature by toggling the "disarm" button shown in FIG. 8. Manual disarming of the tracking feature may also require using the same method that had initially been used for its arming (i.e., using the passcode, when used initially). If the timer is not disarmed at the expected end of the trip, the panic alarm will be set off.

There may be a pre-programed sequence of events by which the traveler and the system may interact, once the standard arm/disarm rules are violated, or if the traveler deliberately toggles the "panic" button shown in FIG. 8 at some intermediate point on the trip.

If the person encounters a dangerous situation while en route and toggles the panic button, the system may respond similar to a silent burglar alarm, and may trigger a request for confirmation that the user wants the panic message sent out to notify family members and/or to receive assistance from police/fire/medical personnel. The confirmation may be based on the predetermined user authentication method(s) that is/are chosen. The App user may have the option to enter a pass code to deescalate the severity of the situation, because it was a false alarm or because a potential threat had dissipated (e.g., two threatening individuals who began to confront the traveler became disinterested and eventually moved away). In this case, no further action would be taken by the system, unless the user again toggles the panic button, or the arm/disarm rules are otherwise broken.

However, if the App user responds to the request for confirmation of the panic alarm, by entering a preprogrammed duress code, an open escalate response would be triggered. This may include having the system send a second message to inquire if assistance from any one of the traditional first responders is appropriate (i.e., should the system request assistance from police, or the fire department, or emergency medical personnel, or a combination of those first responders). Also, because the person may be unable to respond to the second message due to the severity of the situation, the open escalate response of the system may include directing PTZ cameras, if available, to scan the location of the user's mobile device, and if warranted, sending a drone to also observe the area. The open escalate response may also include providing instructions to the first responders who may be en route, based upon the information received from the cameras and/or the drone(s). The provider of the security system may also retain security ambassadors throughout a city or region-ambassadors who may be able to provide various types of personal assistance in response to a panic signal sent from and confirmed by a user. The ambassadors may also carry smart phones or other such devices, and may thereby be directly notified by a server of the system, regarding a nearby person who may have triggered an alert indicating that they require assistance. The ambassadors may be employees of the service provider, or may be off duty employees, and/or sub-contractors. The App user may also have the option of selecting a particular security ambassador as their trusted agent. The extent of the escalation may be determined in advance by the settings selected by the user.

Figure 9:
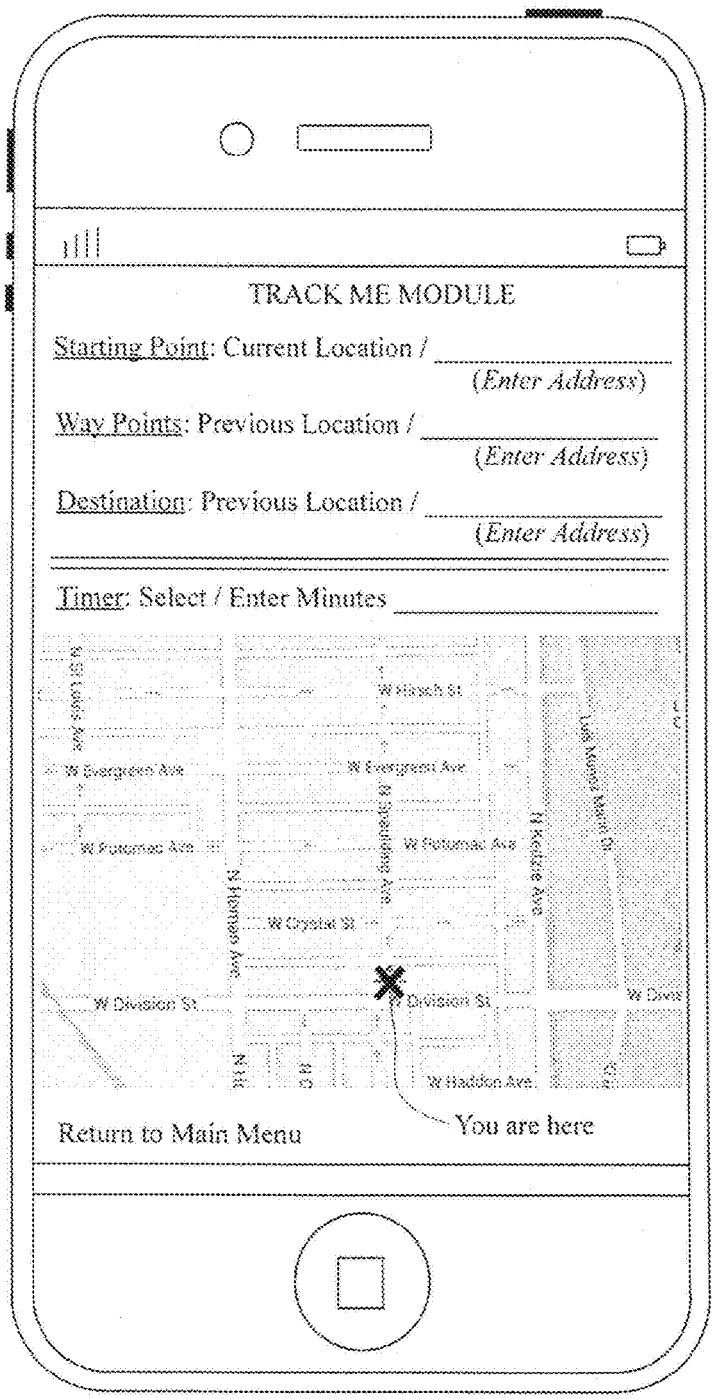
FIG. 9 illustrates an alternate embodiment of the "Track Me Module" shown in FIG. 6, and additionally includes a timer option.
Figure 9A:
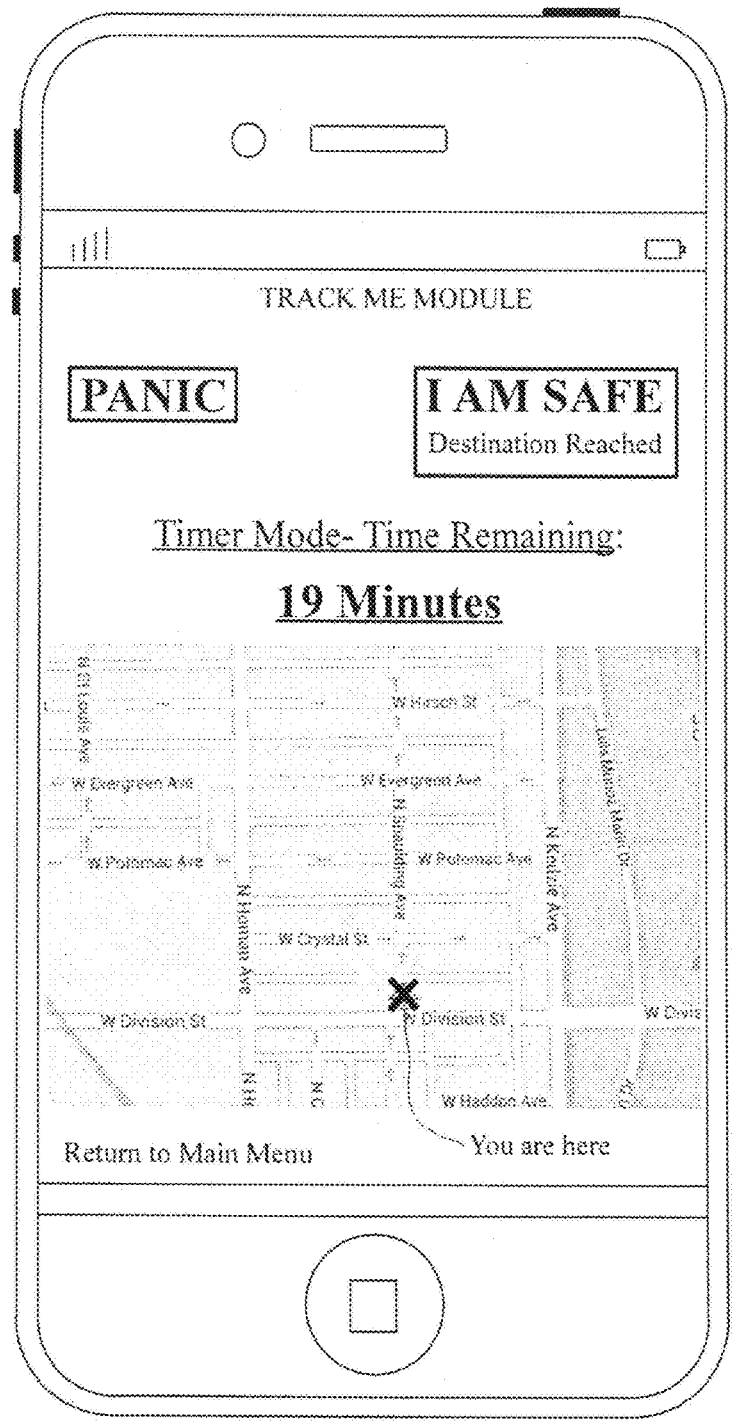
FIG. 9A shows the screen of the smart phone of FIG. 9, but after the user has selected the timer option, and when only 19 minutes remain of the time that was originally entered.
Figure 9B:
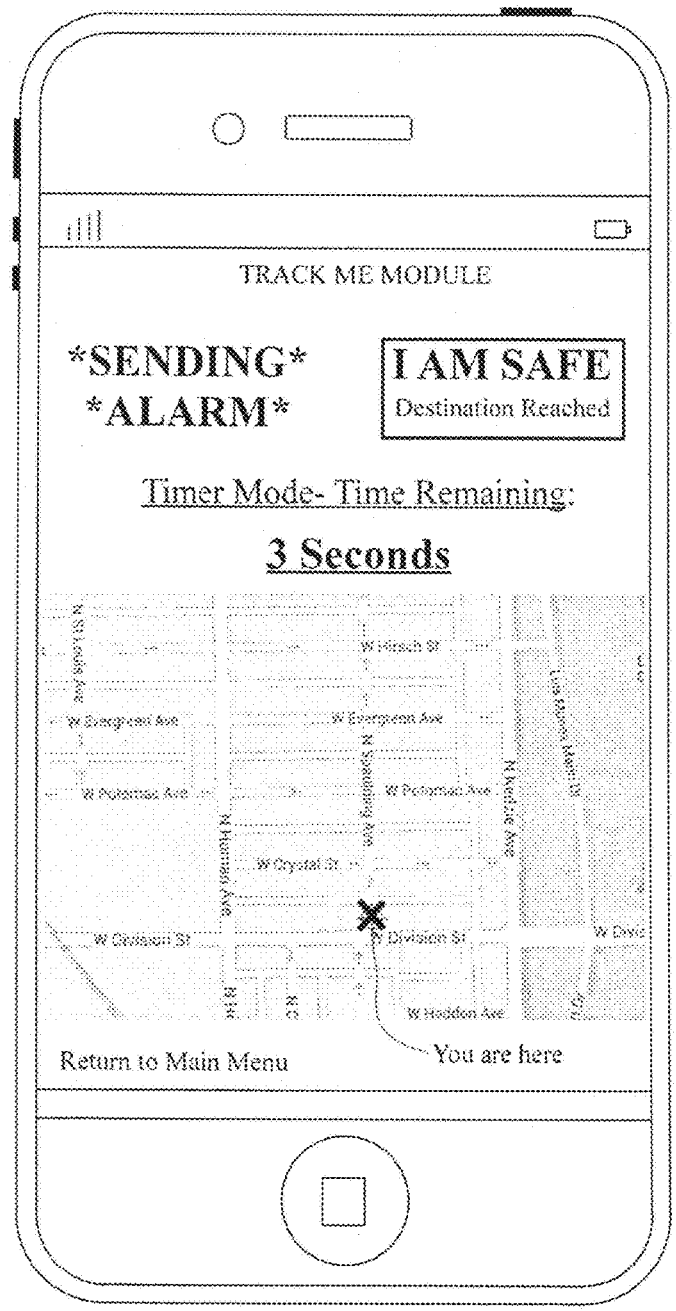
FIG. 9B shows the screen of the smart phone of FIG. 9A, but when only 3 seconds remain of the time that was originally entered.
Figure 9C:
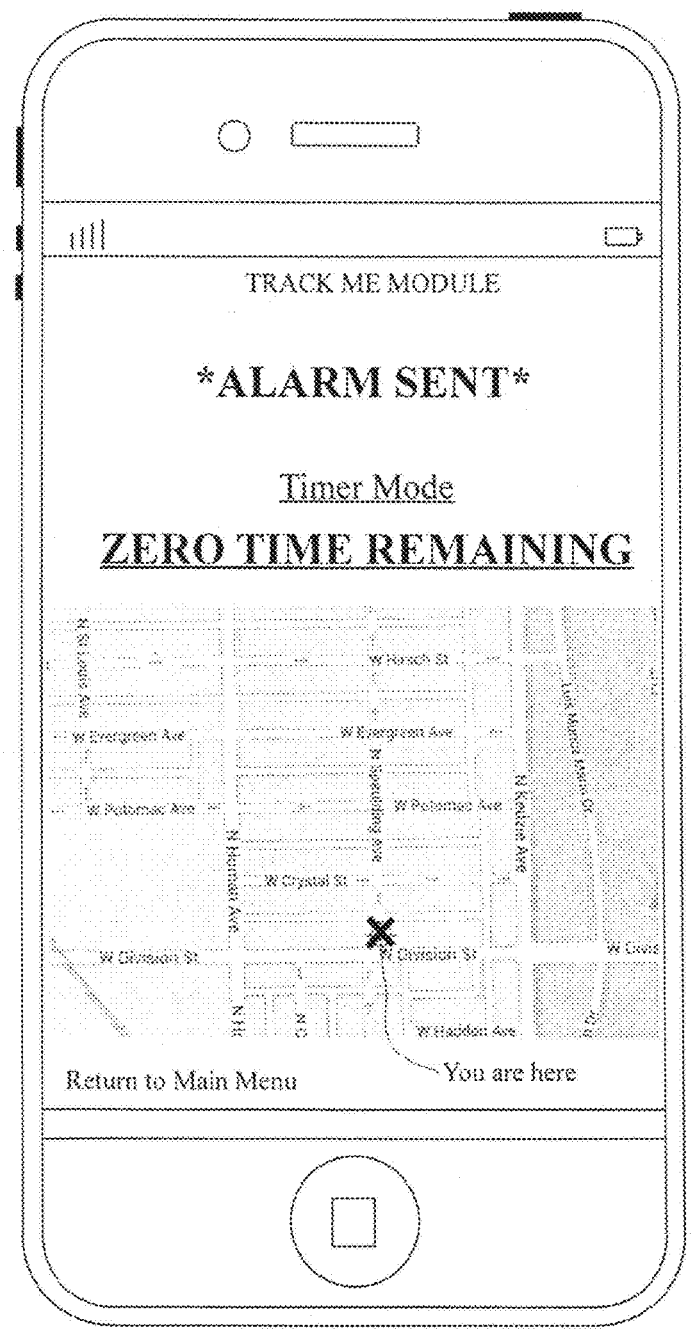
FIG. 9C shows the screen of the smart phone of FIG. 9A, but when only zero time remains of the time that was originally entered.
Figure 9D:
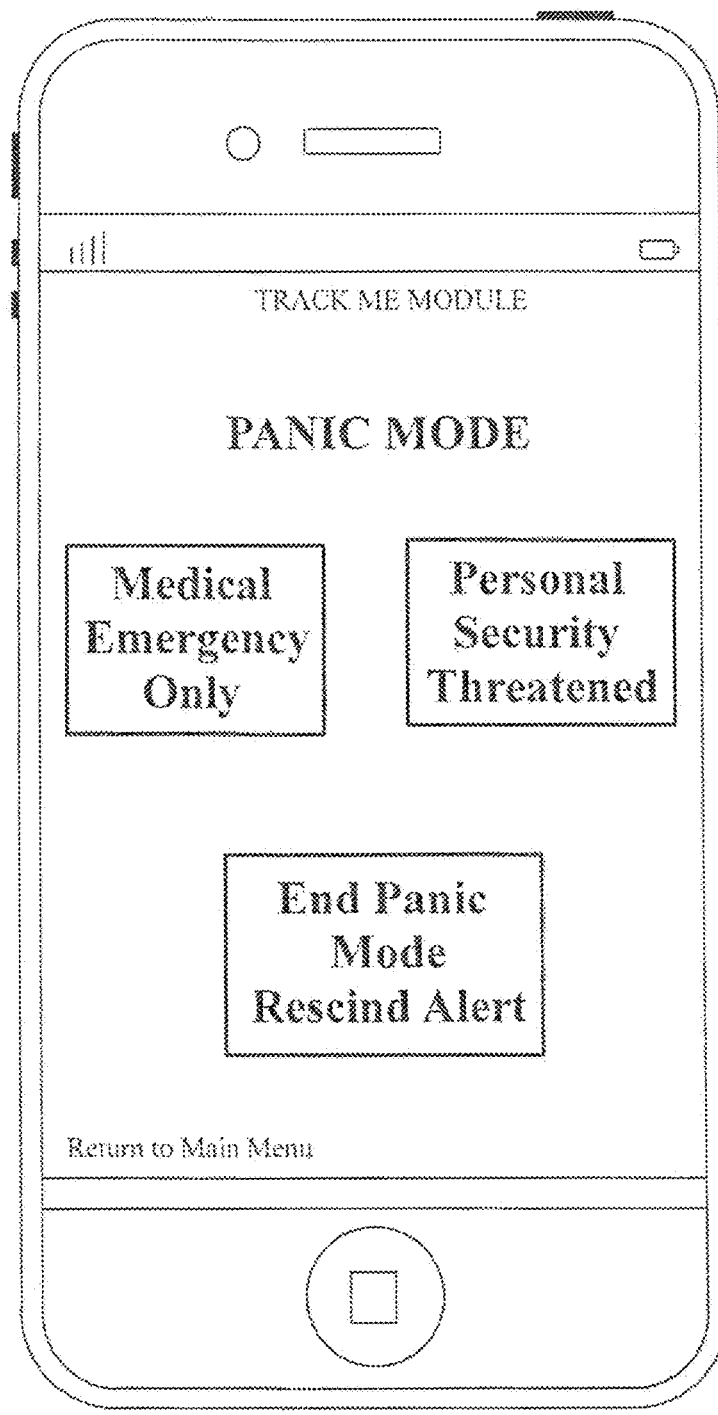
FIG. 9D shows the screen of the smart phone of FIG. 9A, but after the user has toggled the panic button.

The App may also provide an option to the user who pressed the panic button, of further identifying the type of emergency, as seen in FIG. 9D, so that, if able, the person in distress may identify if it is a medical emergency, or if instead his/her personal security is threatened. If the user's personal security is threated, it may necessitate notifying both law enforcement and medical personnel. Failure to press either button may result in both types of responders being notified of the user's distress. If the user indicates that it is only a medical emergency, the server of the system may send notifications to other App users in the area, to solicit help from someone who may be in even closer proximity to the person in distress, than the security ambassador.

Another mode of the track me module is the provision of a panic alarm being sent upon the disconnection of a peripheral device. For example, the software program may be configured such that when a headphone is disconnected from an audio jack, the alert is activated. In an Emergency the user simply needs to disconnect the headphone and the panic notifications are sent off. The disconnection trigger may also be tied to the reception of a Wi-Fi Signal in a safe zone. If the Wi-Fi connection is broken, i.e., the person moves outside the safe-zone covered by the Wi-Fi signal, the duress may be triggered.

The system may provide several other methods to indicate that the person is under duress, which can then be treated as an escalated Panic alarm.

First, the person may enter a duress passcode, which may be a specific passcode that signals duress. Also, if a disarm passcode is requested by the system, and if the traveler is actually under duress at that point in time, then he/she may instead enter the duress code, and the system will indicate disarming, but will actual trigger a duress alarm to the backend. Therefore, if the traveler was accosted and intimidated into disarming the device, they may pretend to disarm the feature, while actually requesting assistance.

Second, the module may utilize speech recognition, and duress may be activated when a pre-determined trigger word or phrase, such as "Help Me." is spoken into a microphone on the device, and recognized by the device. Alternatively, more discrete trigger phrases may be used, such as "The train is leaving Cleveland."

Third, duress may be triggered by moving or shaking the mobile device in a pre-determined pattern, so that the onboard accelerometer may detect the pattern to initiate the duress trigger.

Fourth, duress may be triggered by exceeding a threshold distance between the wireless pairing of the mobile device with certain other technologies, such as a Bluetooth (or Wi-Fi) pairing, i.e., when pairing is broken, duress is triggered. Also, the paired device can trigger duress based on activating a specific button thereon.

Fifth, vital signs may be harvested from bracelets such as a fitness bracelet, or a security vest with bio monitoring, or any other vital sign monitoring device. The person can pre-determine the specific vital signs and thresholds which would trigger a duress alarm.

In the case where the traveler experiences duress, the map of the "track me" feature may provide the location of the closest first responders or security ambassadors that may be available to be routed toward the scene or a specific site during a particular incident.

In addition to the panic button within the "track me feature" a generic panic button may also be provided for the user to utilize when they may not traveling from point to point, and may be exposed (i.e., while waiting to be picked up at a bus stop). The generic panic button may be designed to send an instant quick message with minimal user input. When setting up this feature the user may be provided with several configuration options from which he/she may choose. This may include a push-hold panic button, being a feature where the user pushes a button to arm the panic feature, and when the button is released, the panic message is sent. As there may be a case where the traveler determines that a potentially dangerous situation has been diffused and does not wish to release the button to send the panic notification, there will also be a provision for disarming without sending the panic message, such as by the entering of a passcode. Other means of triggering the generic panic button may be similar to that of the panic button within the "track me" feature, such as:

the capability to arm the panic mode with the headset connected to the mobile device, and to trigger the panic message if the headset is pulled out of the device;

the capability to train the device to listen for a specific trigger word or phrase to send the panic message;

the capability to train the device to trigger the panic message based on a specific memorized motion;

the capability to send the message based on the device's battery life being drained below a threshold amount; and The Panic message that may be sent may have the option of listing any one of the following therein; the last numbers dialed by the mobile device owner, the numbers of the most recently received calls, the most recent texts messages sent, and the most recent text messages received etc.

In the case where the user of the App may have been accosted, and was unable to trigger the panic button, once there is only a small amount of time remaining of the time allotted for the trip (e.g., 3 seconds remaining), the screen of the App may change to be as seen in FIG. 9C, as the device prepares to send an alarm signal. The device may also vibrate or beep to provide an aural alert to the user, in case the user was merely distracted and was not under duress. If so, the user may toggle the "I am Safe" button, otherwise the alarm will be sent as the time expires.

In another embodiment of the Track Me Module, as seen in FIG. 9, the user may be walking only a short distance (e.g., around the block of a bad neighborhood), and/or may simply expect to be loitering in the general vicinity of a particular location, such as when a worker leaves the building where he/she works, and walks down the street to stand and wait at a bus stop. In such instances, the person's personal safety may be uncertain for the period of time that they may have to wait alone at the bus stop, or may be walking around the block of a familiar neighborhood, and may therefore more aptly make use of the Track Me Timer shown in FIG. 9. If the person has an expectation of having to stand/loiter at the location for a certain amount of time, they may set the Timer to correspond to that time period. For example, if the bus stops at that particular bus stop every 15 minutes, the person may, upon reaching the bus stop, set the timer for 20 minutes. The timer may be set by entering an amount of time, or if the "Select Time" option is toggled, the display may change to display a list of standard time increments (e.g., 5 min, 10 min., 15 min., . . . 1 hour, 1 hour and 10 min., etc.) from which the user may choose. Once the time period is selected, the display may change to be as seen in FIG. 9A. in which the time remaining before an alert is sent, is prominently displayed on the screen (e.g., "19 Minutes Remaining"). Once the person reaches safety (e.g., boards the bus. or reaches the destination that may be around the block), he/she may toggle the "I am Safe" button, which may be a green-colored button that ends the time mode. If the person's safety is endangered and he/she fails to toggle the "I am Safe" button, once the timer has counted down to "3 Seconds" remaining, the message "Sending Alarm" may be displayed on the screen, and may be flashing and be yellow colored. In addition, the software may prompt the device to vibrate to bring the warning message to the user's attention, in case they are not in any danger, and have merely forgotten to toggle the "I am Safe" button. Once the time is exhausted ("ZERO TIME REMAINING"), as seen in FIG. 9C, the alarm will be sent, and will be so indicated on the screen.

In yet another embodiment of the Track Me module, the user may instead have the option of being tracked in relation to a Geo-fence, as seen in FIG. 6. The user may "Select" an existing Geo-Fence, or may create one using a map screen that may be displayed for the user. A plurality of existing Geo-Fences may be supplied with the App, such as University campus boundary, neighborhood boundaries. National Park boundaries, etc. If the user selects a university Geo-Fence boundary, the App may notify the user once he/she leaves the campus grounds, and may display a message onscreen with a red or red/blue button (e.g., a message stating. "You are currently outside of the campus area, please click this button to call 911"). Pressing the button would immediately dial 911 and send a pre-recorded message for help. While in the Geo-Fence truck me mode, the App may send messages and reports to a predefined email address, SMS, or may autodial to a selectable individual (or any combination of the above), which may allow the App to work independently of a command center. The college campus in this example may also be a user subscriber of this service, and may be a designated recipient of such messages, as the college may seek to protect the registered students while they are on the campus grounds (within the campus Geofence). Any alert signaled by the student may immediately be transmitted to the campus police/security. However, the college may only seek to protect the students while on campus and not have any liability once the student has proceeded off campus (outside of the Geofence), which position (inside or outside the Geofenced campus) mas be ascertained by the student's GPS location, at which time the default notification, as noted above, may be to the local 911 call center. Therefore, a selected/supplied Geo fence may have particular notification attributes associated with it. In another embodiment, the module may work in the background on the user's device at all times, and may automatically notify the student of his/her positioning feeing off of the campus grounds and beyond the protection of campus security. For example, the module may send the message. "You are now outside of the XYZ College campus, for assistance please dial 911." An emergency distress trigger button may also be automatically presented onscreen (or which may normally reside onscreen), which when toggled, may immediately cause the phone to call 911, so the student can have a conversation with the 911 dispatcher, or alternatively the prerecorded distress message may be sent, particularly if no conversation subsequently occurs.

Blue-Phone-in-Pocket Module:

A variation of the Track Me module is the Blue-Phone-in-Pocket (bPip) module. The blue light emergency phone has been a college/university campus security staple for the past 25 years. Most colleges typically have 25 to 100 or more blue light phones distributed throughout the campus. However, the cost to install, maintain, and upgrade these systems from analog to digital, as well as integrating modern security measures therein is very high, especially when compared to the low level functionality afforded by the phones. Campus blue light phones feature a push-button which sends an alarm to whoever is monitoring the system. Two way communication is established at least while the person stands at that phone/location.

Because nearly every student on campus has a mobile phone and a data network, either cellular or campus Wi-Fi, when they are in trouble or need assistance, they may instead simply pull up the bPip module of their See it Send it App on their phone. Such use of the person's own device would typically be much faster than if the student had to first locate and then walk/run to the nearest blue light phone, if they are even able to proceed to the phone. When the App user pushes the blue button of the App on the screen of his/her phone to request help, the App may instantly record and transmit key information. Such information may include the student's name and contact information, the exact time that the button was pressed, the location of the user's device (via GPS, etc.) at the time they pushed the button. The App may also communicate this information to a command center (SOC).

The App may also communicate audio from the phone's microphone/speaker to potentially appraise emergency responders as to the current condition of the person in distress, and the presence of other people who may be in his/her vicinity. The App may also communicate visual data using the phone's camera (video or periodic snapshots, perhaps being roughly every 5 seconds) to further appraise emergency responders as to the situation surrounding the person in distress. The App may also record the audio and visual data, in addition to sending it to the SOC. The SOC Operator may therefore be able to immediately call the phone to establish communication and inquire the exact condition/status of the student, and/or find out what assistance is needed.

The SOC may also know what other persons may be in the area (e.g., other student users of the App, faculty members who may use the App, and emergency responders). This feature therefore provides multiple benefits, as the SOC may direct those students/faculty members to act in a responsible and an appropriately safe manner, which may depend upon the nature of the emergency.

Where a student (or even a faculty member) may only experience a stand-alone medical emergency and uses the App to request assistance (e.g., fell and broke a leg, person is experiencing symptoms indicating the onset of a heart attack, etc.) the SOC may ask any available students/faculty in close proximity to the person requiring assistance, to respond to the call for help, and render immediate assistance until emergency responders can arrive on the scene. To accomplish this functionality the App may thus communicate with a central server to continuously transmit and identify the location of each user via the GPS capability of his/her device. This permits the location of each user to be superimposed on a map, in relation to the position of the person experiencing the medical emergency, all of which may be available to the SOC. The SOC may then call one or more App users who may be in close proximity to the person in distress, to ask if any would provide assistance, and to direct them to the person in distress if they agree to render aid.

The system software also may automatically send text requests to other nearby students to ask for their assistance, and to direct them to the person in distress, as there may be 10 of 15 students nearby, which may require an excessive amount of time for the SOC to call to ascertain who may be willing to respond for a particular incident.

Alternatively, or addition to the SOC calling personally or the text messages, the server may automatically call several of the nearest App users and deliver a pre-recorded message requesting that the user provide assistance for the medical emergency, and with the server additionally providing specific directions at the end of the pre-recorded message for each particular App user, to particularly direct each user to the person requiring assistance.

A reward system may also be used to encourage willing and able students to respond, such as a small cash award (e.g., $25) as a financial incentive to the first student to reach the person in distress, which may be determined by the GPS data received by the server and displayed on the map monitored by the SOC. To prevent fraud on the system, the person requesting assistance may also agree to a monetary fee for such emergency usage, where the fee may be used tor the reward. This closed loop would serve to prevent two or more students from attempting to defraud the system to earn response fees for a staged incident.

In a different scenario, the App and the SOC may direct those students/faculty members to act very differently in order to be responsible and safe, which may occur when the nature of the emergency is dangerous to them and/or to other person's in the area. Such an emergency may just be a physical altercation between two individuals, or may be when a shooting incident occurs on campus or in a community, in proximity to the App users, particularly when the shooting is ongoing. In this case the APP may send a warning to the App user to direct them away from the shooting incident. Although it is common to send a text message as a warning for certain events, particularly meteorological events (e.g., a flood alert), such text messages quite often go unnoticed by students for a substantial period of time, because students often send receive hundreds of text messages a day, and because the students may be in the middle of class and may be waiting until the end of class to review any messages received. To avoid the risk that a student would delay receiving such an alert, the App may be set up to use the speaker of the user's device to provide a loud (e.g., full volume) aural warning (e.g., "Warning—Danger, Shooting in Progress—exit campus immediately avoiding Building X"). The aural message may repeatedly be announced on the device until the user acknowledges the alert by toggling a button on the screen of his/her device. Alternatively, the aural alert may continue at a reduced volume, until the person has traveled away from proximity to the perceived danger zone (e.g., moves to be a threshold distance away, e.g., at least a quarter of a mile away, from GPS location of the shooting incident, or the shooter's current location if on the move). Because such an event may persist for a lengthy period of time, as in the 2007 shooting spree at Virginia Polytechnic Institute which took two hours to be finally resolved, students that may have received an initial warning text, may resume their usual activities and may be less aware of the continuing danger. Therefore, the App may also provide additional warnings to those App users who may be immediately outside of the threshold safety distance (i.e., less than a second threshold distance away, such as less than a half a mile away hut more than a quarter mile away), and who may be in transit and heading generally toward the shooter's location. To better appraise the App user of the potentially dangerous direction of travel, the App may send a series of periodic warning texts identifying the shooter's location, such as a text message every 5 seconds, or every 10 seconds, etc., until the App user ceases movement towards the shooter.

The App may similarly utilize one or more textual warning message for other categories of events (e.g., non-violent criminal activity such as reported thefts, or natural disasters such as tornados, earthquakes, severe lightning storms, etc.).

In general, some of the benefits of the bPip module are quicker reporting and identification of the problem: richer, more accurate and timely data as well as real time updates of that data: provision of situational awareness data (who is around there), faster possible response time to the location to mitigate the event, etc. The (bPip) module provides students better access to an emergency device (their own phone) at a lower overall cost than the blue phone, with better situational results. The (bPip) module may also send messages and reports to a predefined email address, SMS, or a selectable individual, or any combination of those options, which may permit the module to work independently of the command center.

The mobile App may include an incident reporting module, which may have the capability to report the details of an incident, including the category of the incident, the location, a brief description of the incident, and any related pictures or video that may have been captured.

With respect to the category of the incident, the user may be able to choose from several standard categories. The module may also be utilized by a particular organization/client (i.e., a neighborhood watch group), and that organization may create their own categories for their users to select from, such as: Suspicious Activity, Crime in Progress, Maintenance, etc.

With respect to the location of the incident, some standard location choices may be provided, such as "Use My Current Location." Also, the client may create their own locations for their users to select from, such as: "Parking Lot A," or "Admin. Building," or "Penn Station," etc.

With respect to the description of the incident, a free form text field (e.g., an information box) may be provided for the user to enter a textual description. This may be supplemented with pictures/video, for which several options may be provided. The App user may have the choice to utilize the onboard camera of the device to take new photos or videos, or may instead select existing photo/video files. Once the photo or video file is selected, the application may start uploading the file to a temporary area on a server of a system administrator, while waiting for the command to submit the incident. Once the incident is submitted, the textual description and other data may be submitted immediately, even if the file upload is not complete. The file upload may follow the data, and once the upload is complete, the incident data on the server may be updated. The incident data may also include three dimensional GPS coordinates, as well as unique identifiers from the device, and the identity of the user that was logged as having submitted the incident.

The incident reporting module may be further enabled in certain embodiments.

Figure 11:
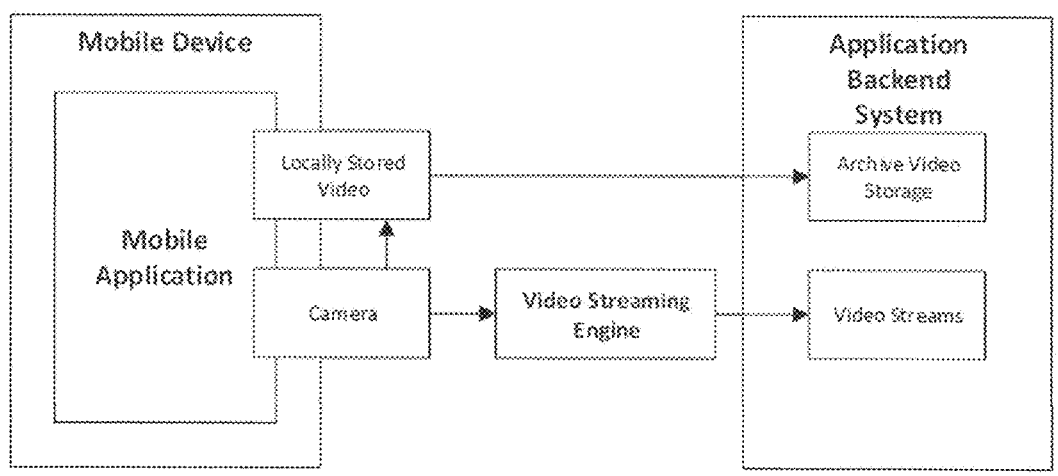
FIG. 11 is a block diagram illustrating dual function video architecture that may be used for the incident reporting app.

One such embodiment may provide dual function video architecture. The incident reporting mobile app may stream live video of an incident directly to the application's backend system (e.g., the server), and may allow for a variable bitrate live video stream to be sent out by the mobile device to the application's backend streaming engines. The bitrate may vary depending on the strength of the network connection. The video may be recorded directly on the streaming engines as the stream is received in real-time. The limitation of a video recorded from a variable bit rate, especially on a cellular network, is that the connection is seldom perfect. In most cases the video will be streamed at a lower bitrate affecting the resolution of the video recorded on the streaming engine. The dual function video architecture may overcome this challenge, as the incident reporting mobile app may store the video locally on the (client) device with the highest resolution possible, while at the same time forwarding a live stream via a variable bitrate to the application's backend streaming engines. After the live video streaming is complete, the locally stored high resolution version of the video will be uploaded to the application's backend storage as an attachment to the incident. This may be beneficial for video analytics as well as forensic applications post incident. As illustrated schematically in FIG. 11, the dual function video architecture, to support dual video streaming, may consist of the following:

> the mobile application with live video broadcasting and video recording capabilities, built for multiple platforms;
> local storage on the mobile device;
> archive video storage on the application's backend system; and
> a media streaming engine to receive the live video feed.

Figure 12:
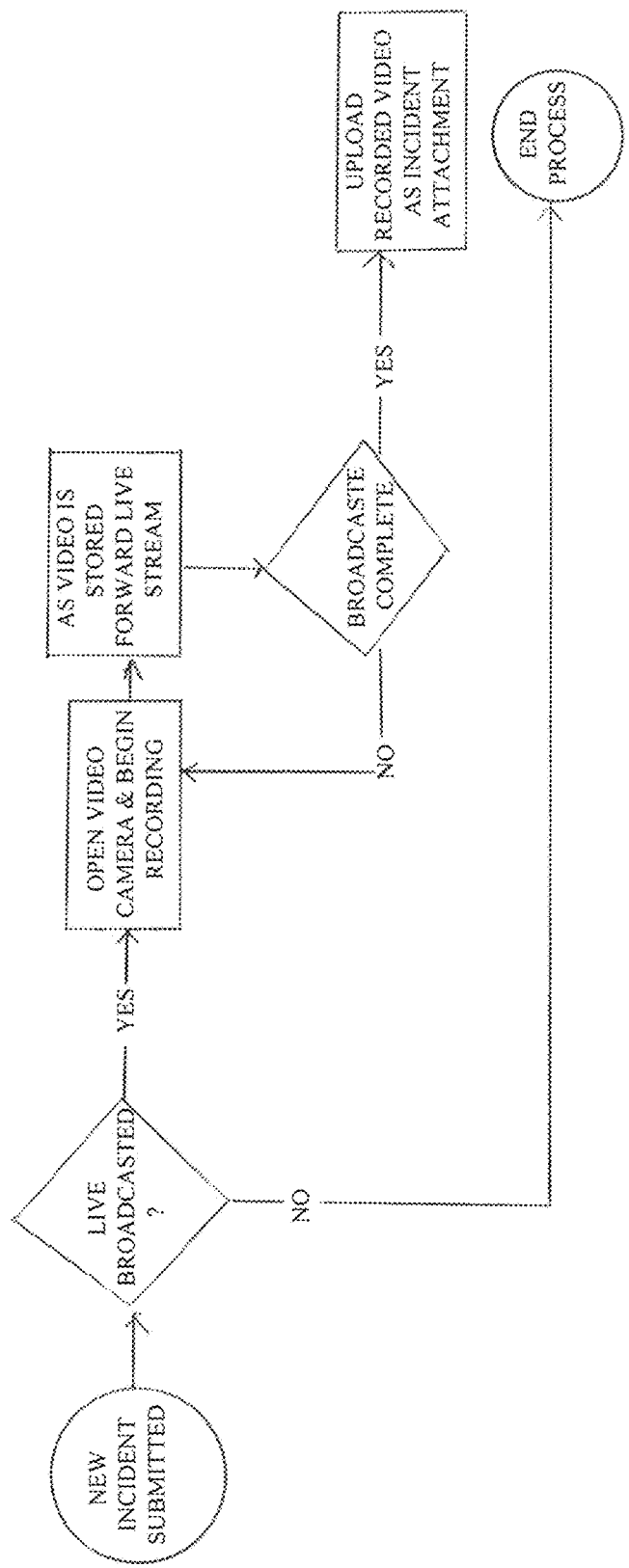
FIG. 12 illustrates a process for incident reporting in accordance with the architecture of FIG. 11.
Figure 13:
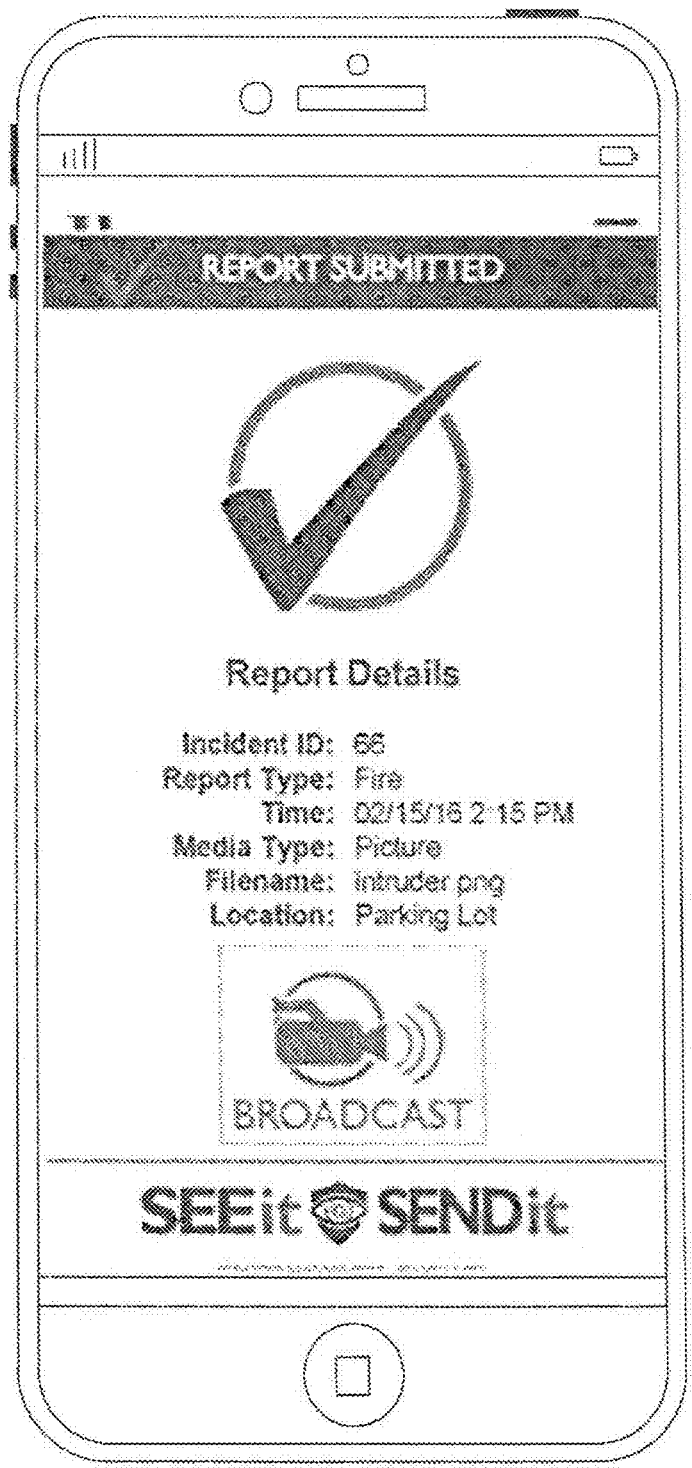
FIG. 13 illustrates the screen of the exemplary smart phone of FIG. 2. but being shown after a user has successfully submitted details of an incident.
Figure 14:
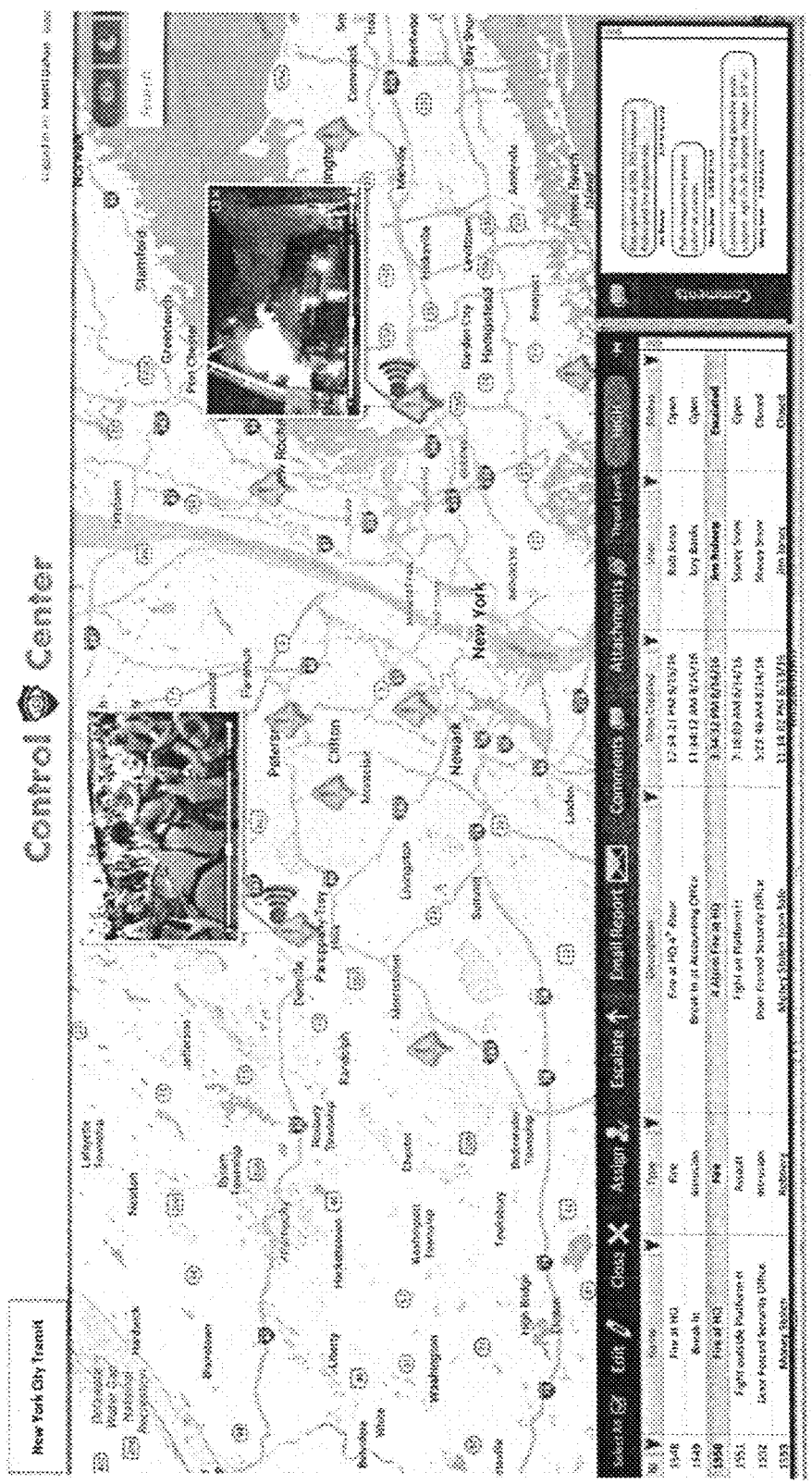
FIG. 14 illustrates a backend system user interface that includes thumbnail window images/video of the incident superimposed on a map image, proximate to the location of the incident, and also shows an incident management module therein.

A flow chart depicting one embodiment for the process for incident reporting using this architecture is shown in FIG. 12. A user may open the incident reporting app, on his/her mobile device to report an incident, and alter successfully submitting the description of the incident as illustrated in FIG. 13, the user may click on the Broadcast button to commence live broadcasting. Video may automatically start recording locally, while at the same time streaming from the device to the backend video streaming engines. Once the live video broadcasting is complete, locally stored video is uploaded to the backend storage as an incident attachment. The operator can then review the attached video via the incident management module in a backend system user interface. As shown in FIG. 14, the live broadcast video from multiple users (i.e., from multiple mobile devices) can be viewed on the backend system user interface, which may display each broadcast video in thumbnail windows positioned proximate to the incident's geographic location on a map image. An incident management module may be positioned below the map image, and may list the ID number of the incident, the type/name of the incident, a succinct summary of the description of the incident, the time it was submitted, the name of the person submitting the report, the status of the incident, and the threat level of the incident.

Another embodiment of the incident reporting mobile app may also provide for a dual resolution image upload. The incident reporting mobile app has the ability to upload an image of an incident from the mobile device directly to the application's backend system, and may permit uploading of the image as is (i.e., the highest resolution available). However, when connected via a cellular network, that the connection is seldom perfect. A very high resolution image can take an excessive amount of time to upload on a low bandwidth network, since it will tend to be a very large file. That may leave operators (e.g., first responders) without critical information when responding to an incident. Use of the dual resolution image upload will address this challenge by uploading two images—a high resolution image (which takes a large amount of time), and a low resolution image (which may be very quick). The mobile app may continue to upload the image as is (highest resolution available), but may also compress a copy of the high resolution image to create a low resolution version, and may send the low resolution version at the same time. With this approach, the backend may receive an image immediately, albeit a low resolution one. Once the high resolution version is received it may replace the low resolution version. This would be beneficial for situation management, suspect searches, as well as forensic applications post incident. As illustrated schematically in FIG. 15, the architecture for dual resolution image upload may consist of the following:

> the mobile application with image uploading and compression capabilities.
> the application being built for multiple platforms.

Figure 15:
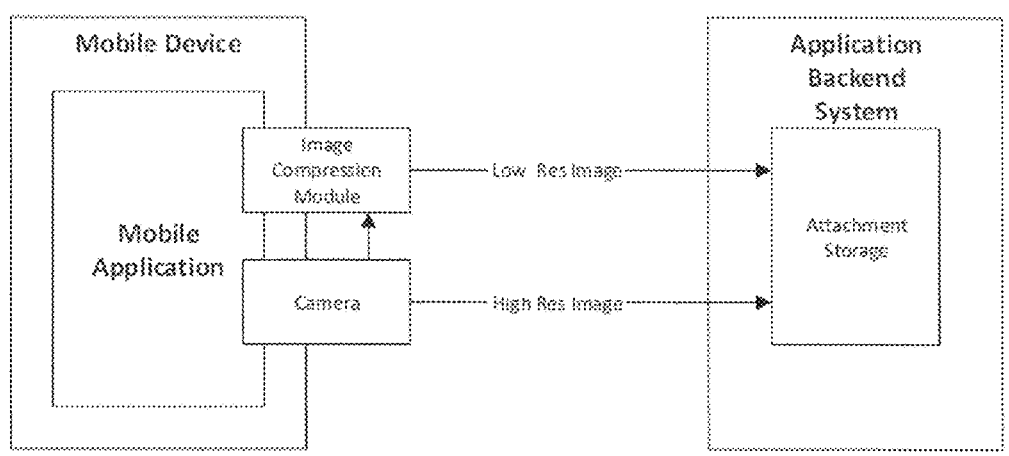
FIG. 15 is a block diagram illustrating dual resolution image upload architecture that may be used for the incident reporting app.
Figure 16:
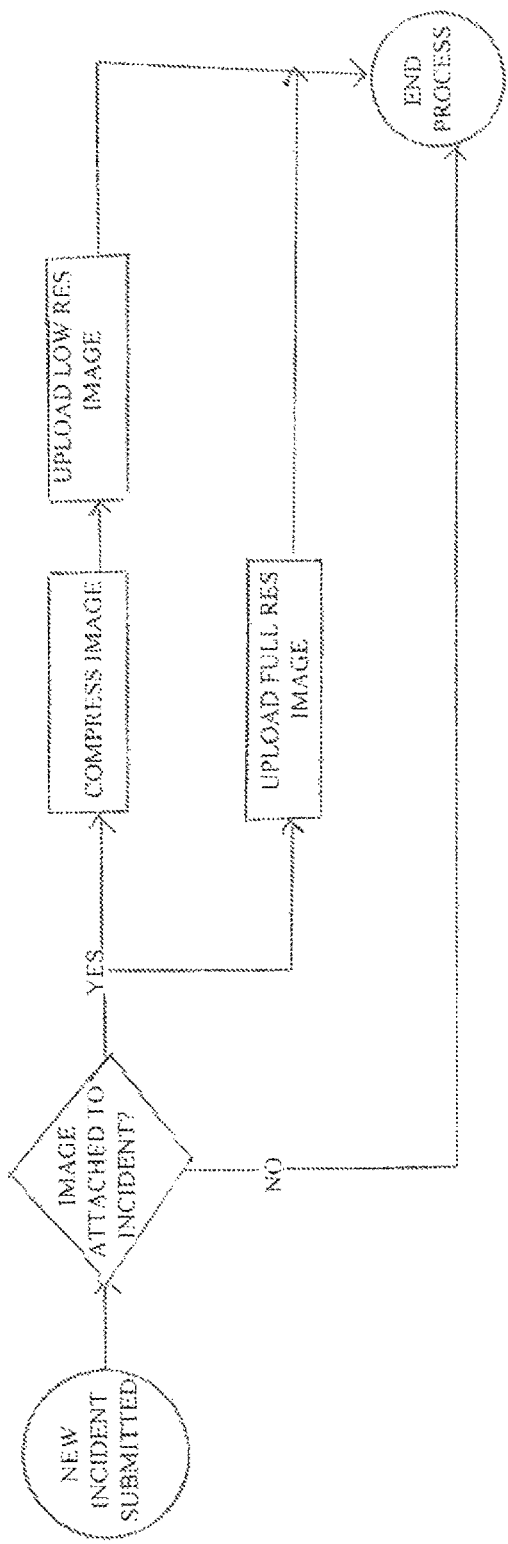
FIG. 16 illustrates a process for incident reporting in accordance with the architecture of FIG. 11.
Figure 17:
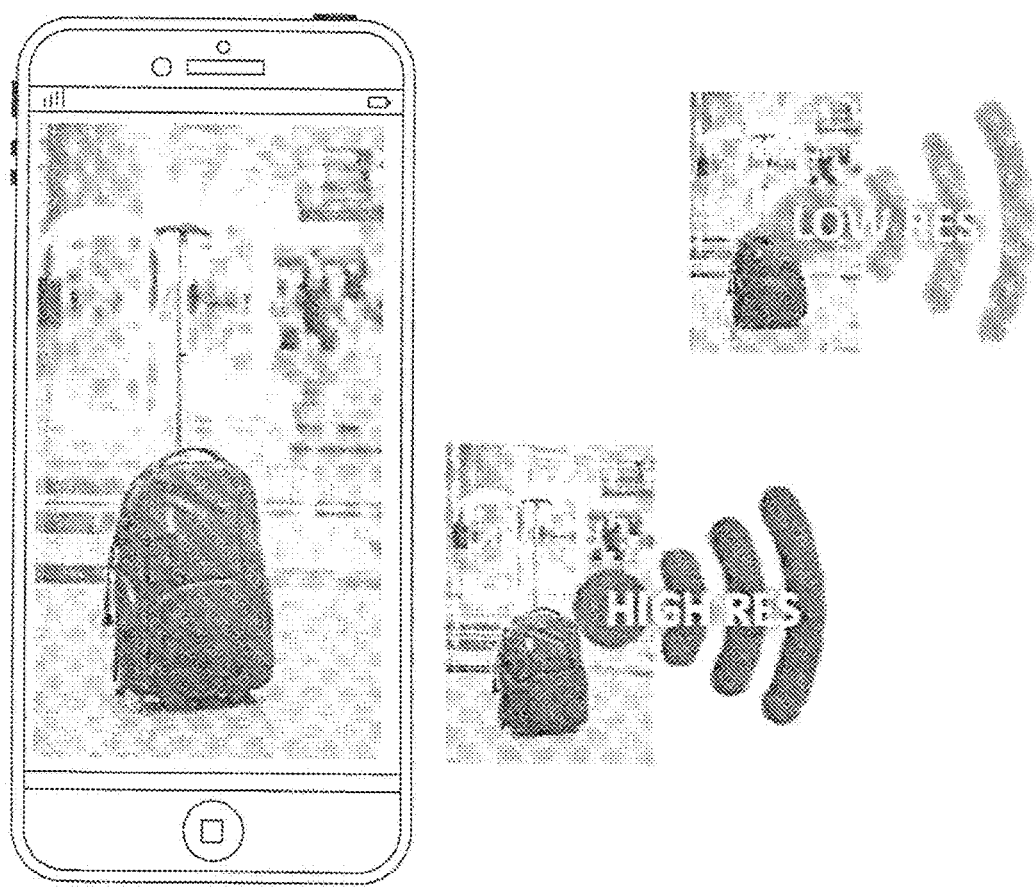
FIG. 17 is a schematic illustration of a mobile device submitting a captured image using the dual resolution image upload architecture of FIG. 15.

A flow chart depicting one embodiment for the process of incident reporting using the architecture of FIG. 15 is shown in FIG. 16. A user may open the Incident Reporting mobile app on their mobile device to report an incident, and may attach an image with the report. The image is automatically compressed and uploaded after clicking "Submit." The compressed image is uploaded with the report, and the high resolution image is uploaded afterwards, which is illustrated schematically in FIG. 17. The low resolution image is received immediately by the application's backend as it requires only a very small file size. The high resolution is received later on depending on the bandwidth of the network connection. Once the high resolution image is received it may replace the low resolution image attached to the incident report.

Figure 18:
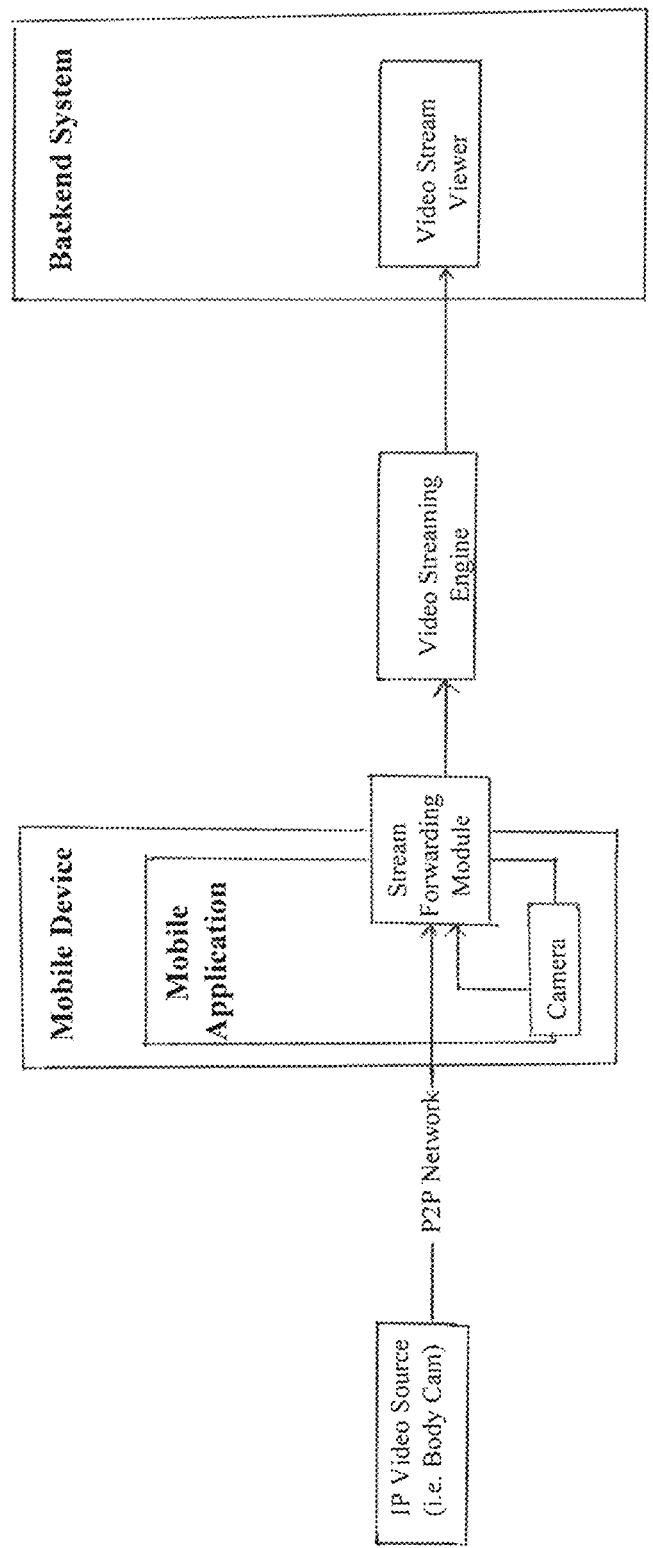
FIG. 18 is a block diagram illustrating IP video stream forwarding architecture via the mobile device using a peer-to-peer network.

Another embodiment of the incident reporting mobile app may also provide for IP video stream forwarding via the mobile device. The incident reporting mobile app has the ability to stream live video of an incident directly to the backend system (e.g., a server). The use of only the built-in camera of a mobile device (e.g., a smart phone) may be unnecessarily limiting, particularly since there are various external devices available to stream IP video over Wi-Fi or over a cellular network to a backend system or to a mobile app. However, if the external device has no cellular connection and there is no Wi-Fi network available, there is no way for the external device to stream the IP video to a backend. Use of the IP video stream forwarding architecture disclosed herein will address this challenge. The incident reporting mobile app may receive IP video streams from various Wi-Fi enabled devices connected via a Peer-to-Peer (P2P) network. The mobile app may then forward the stream to the backend system similar to the way it streams video coming directly from its internal camera. There is no need for any additional equipment, aside from the P2P enabled camera. A unique use would be the case of a body worn cameras (either during surveillance or sousveillance), where low-cost miniature wireless (P2P) cameras can record and broadcast live video to the backend system without the need for built-in cellular (or internet) connectivity. This is made possible by using the mobile phone as the conduit for an external network connection. The mobile device does not merely act as "hotspot" for the external camera, but the video stream acquired via the P2P network is "processed" by the application on the mobile phone (i.e., is transcoded, authenticated, watermarked, with metadata from analytics . . . ) before sending the imagery to the backend system. As illustrated schematically in FIG. 18, the architecture for IP video stream forwarding via the mobile device may consist of the following:

> the mobile application with live video broadcasting capabilities via a stream forwarding module, with the application being built to support multiple platforms;
> external IP video source that can connect over a P2P network; and
> a media streaming engine to receive the live video feed.

For the typical instance of use of this capability, the user opens the Incident Reporting app, on their mobile device to report an incident, and after successfully submitting the incident report, the user may click on a "Live Broadcast" button, similar to the one shown in FIG. 13. An option may be provided for the user to choose the IP video source (i.e., a P2P device, or the built-in camera of the mobile device) to stream, and the mobile app automatically starts streaming to the backend. There is no need for the user to start the external camera manually.

Figure 19:
FIG. 19 is a schematic illustration of a mobile device submitting a captured image using the IP video stream forwarding architecture of FIG. 18.

In another instance of use of this capability, the user may click the button on the external P2P video streaming device (i.e., body camera, drone, etc.) to initiate recording. The incident reporting app on the mobile device may automatically submit an incident report and start broadcasting live video from the external P2P device, as illustrated schematically in FIG. 19).

In yet another instance of use of this capability, an operator may click on a user in the backend application; thus the operator on the back end can choose the command to start live video broadcast from the P2P device or from the built-in camera of the user's mobile device. A new incident is automatically created for that user. The incident reporting app on the mobile device automatically starts broadcasting live video from the external P2P device or the built-in camera. Similar to the dual function video architecture, the operator can review the attached video via the incident management module in a backend system user interface (see FIG. 14).

Another embodiment of the incident reporting mobile app may also include a Field of View (FOV) Heat Map module to extend the incident reporting module via the mobile device. The FOV heat-map module may determine a field of view of a mobile device's camera, including a direction of the view (i.e., compass direction and tilt angle with respect to vertical), a horizontal and a vertical angle of view that may define a 3-D pyramid-shaped (or cone-shaped) viewing area (which may depend upon the use of a zoom lens and the particular camera), and a distance of the camera to from the incident, using the device's built-in MEMS sensors (i.e., the accelerometer, gyroscope, magnetometer, electric compass, and GPS). The distance may be the maximum distance viewable by the camera, based on the type of camera/device (each camera type will have a predefined lens specs), as well as zoom level (if available), or the distance may be a current focusing distance of the camera lens system. The geo-location of the device is also tracked using the onboard GPS sensor.

Figure 20:
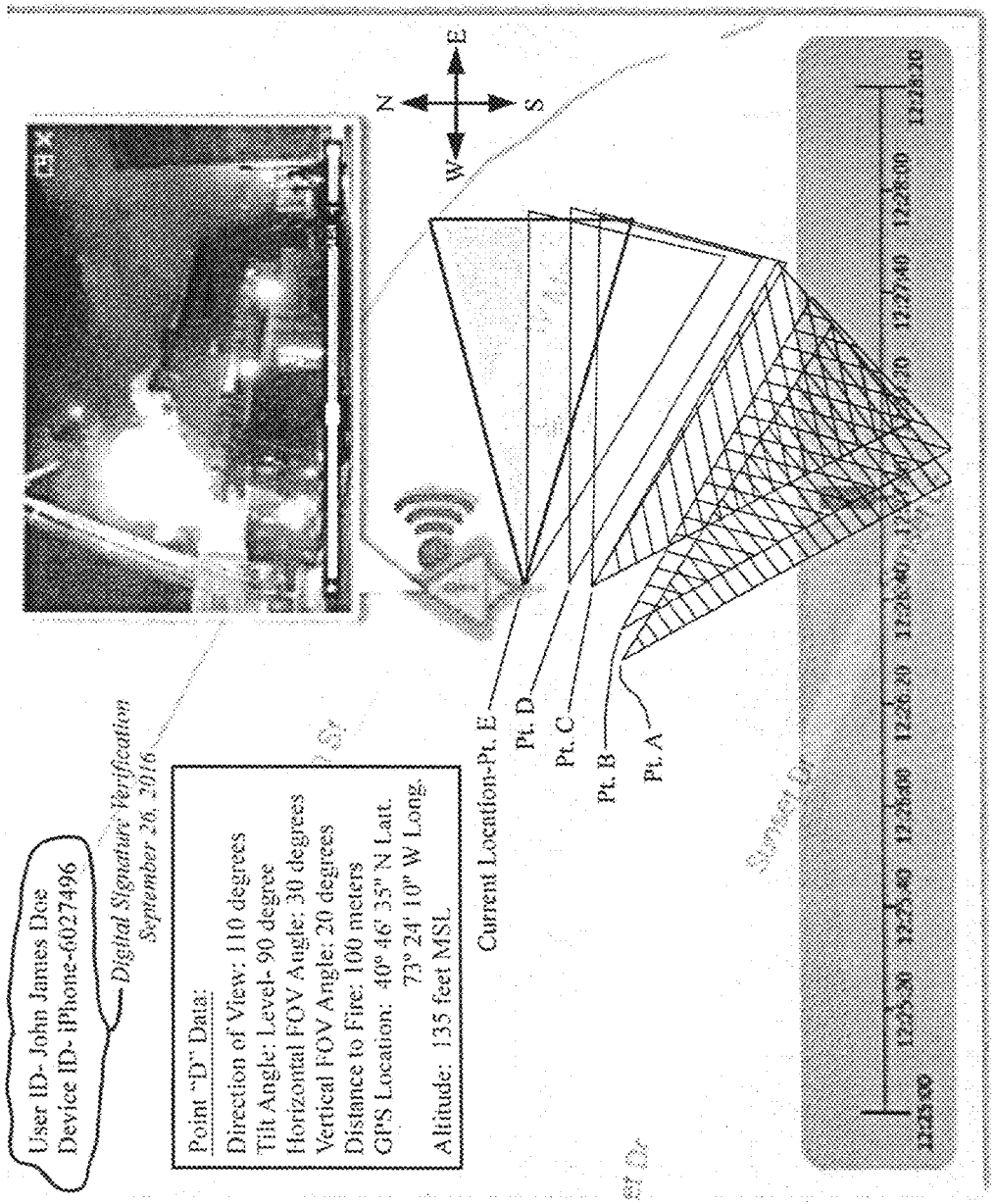
FIG. 20 illustrates a backend system user interface for a Field of View Heat Map Module usable with the Incident Reporting Module, which includes thumbnail window images/video of the incident superimposed on a map image, proximate to the location of the incident, and also illustrates a heat map representation n of the field of view of the device.

As the device pans (i.e., moves beyond a threshold that would exceed ordinary jitter from the unsteadiness of the user's hands), the field of view is updated and forwarded to the backend system with a timestamp. A historical heat-map of each field of view versus time may be illustrated on the user interface map module of the backend system, as shown in FIG. 20. The heat-map can be drawn in real-time as the video is broadcast or reviewed for past broadcasts. For example, as seen in FIG. 20, a user may move from place to place and may record video at five different positions, beginning at point A, then moving to points "B," "C," and "D," and lastly may be currently positioned at point "E," which field of view is shown with a darkened triangular outline. Each triangular FOV shown on the user interface may be colored, using for example, yellow, and which may be darker for the overlapped regions, as illustrated for the triangular regions emanating from points "D" and "E," and from the region using a second FOV from emanating from point "C." The heat map may also be presented without the use of color, as shown for the first FOV emanating from point "C," as well as the FOV for points "A" and "B," which are illustrated using hatching at various angles.

Although the FOV of the camera may currently be originating from point "E," the operator may toggle the marker on the time line track bar back to some earlier point in time for the historical data (e.g., at 12:27:00, which is for point "D"), and the system may display the relevant data for only that point on the screen. For point "D," the direction of view at that time was 110 degrees (i.e., generally facing east-southeast), the FOV angle was 30 degrees, the distance from the incident being imaged was 100 meters, and the GPS location of the camera was: 40° 46' 35" north latitude, 73° 24' 10" west longitude, at an altitude of 135 feet above the mean sea level (MSL). The heat map may be presented to only show the current FOV data, or may show all the historical FOV data superimposed on the image, or may show only the historical FOV data for one point on the timeline.

Figure 21:
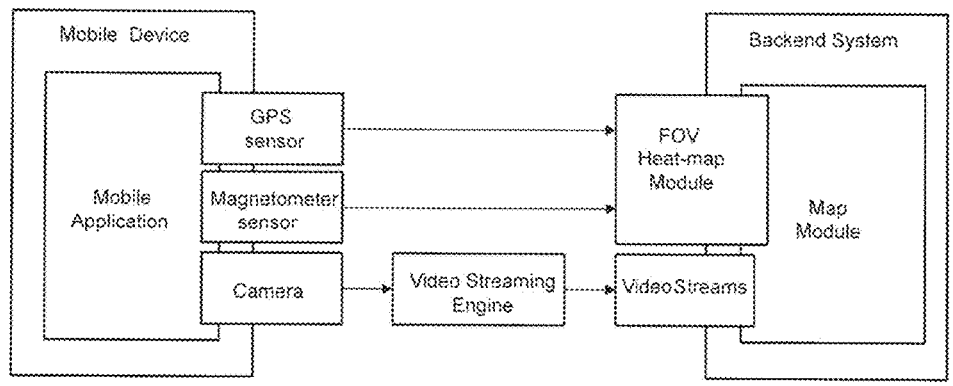
FIG. 21 is a block diagram illustrating the Field of View Heat Map Module architecture via the mobile device.
Figure 22:
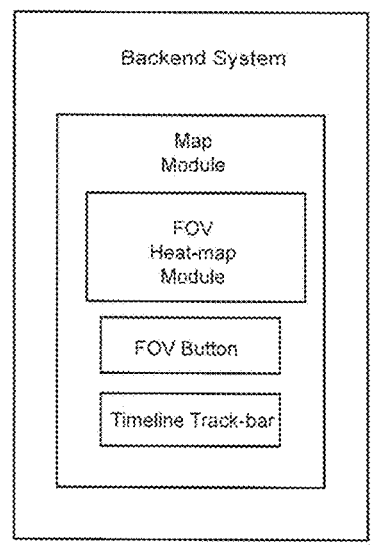
FIG. 22 is a block diagram illustrating other aspects of the backend system architecture for the Field of View Heat Map Module.

The uniqueness of this solution is the ability to view live/historical 2D or 3D FOV (surveillance field of the mobile camera) from video or pictures taken from mobile device to provide geospatial context of visual data. This is accomplished by automatically calibrating and merging the visual data with the telemetry data captured on the mobile phones MEMS sensors. The application and use case would allow the backend system operator not only see the visual data (i.e., video stream or picture), but also know which direction the data is coming from in real-time. The FOV is tightly coupled (or in-sync) to the MEMS sensors, so if the mobile user pans, tilts, or rotates the phone, the FOV will be updated in real-time. The FOV data is also captured and stored so a live "heat-map" is generated. From a forensic perspective, this allows the backend operator to easily identify gaps in coverage or to quickly see where there is the highest density of visual data. As illustrated schematically in FIG. 21, the architecture for IP video stream forwarding via the mobile device may consist of the following:

the mobile application with live video broadcasting capabilities and direction detection using the built-in magnetometer sensor and camera type;
GPS locations are tracked by the device;
application is built for multiple platforms;
media streaming engine to receive the video feed;
database to store historical data of video feeds as well as the FOV and GPS information;
FOV Heat-map module running on the backend system (see FIG. 22) to receive FOV and GPS data from the mobile application; and
backend system user interface to visualize the heat-map data on a map and play live and pre-recorded video.

Figure 23:
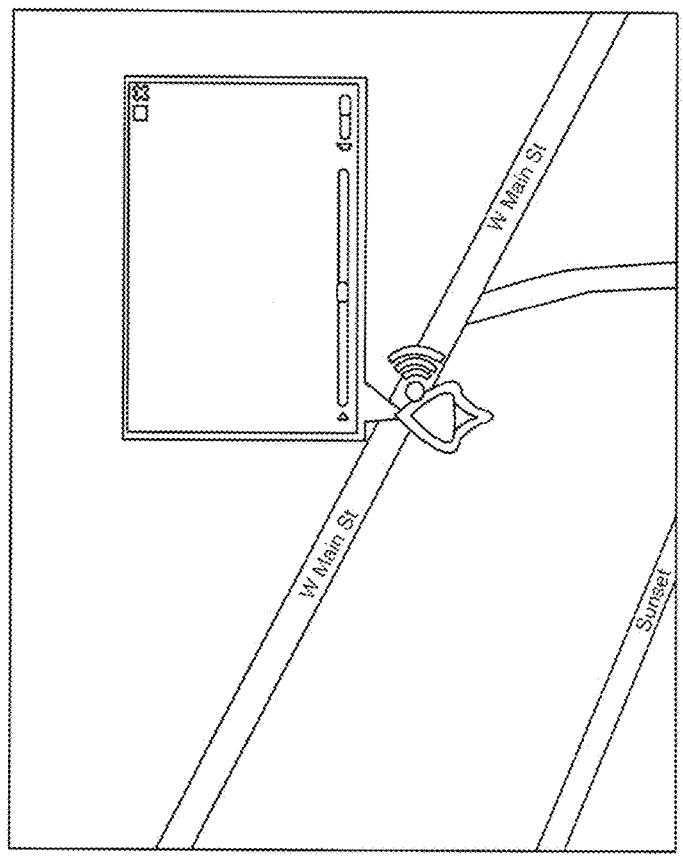
FIG. 23 illustrates a backend system user interface that is displayed when the operator selects an incident listed in the user interface of FIG. 14.

The backend system user interface may have a map module that displays icons showing geo-locations of incidents submitted by a device running the Incident Reporting app, (see FIG. 14). Clicking on one of the incidents may display a current FOV (as a transparent triangle on the map) that is/was submitted by the device for that incident (see FIG. 23). Clicking on the "Heat-map" button may cause the timeline track-bar to pop up (see FIG. 20), which allows the operator to scroll forward and backward through an incident's historical data, and may also draw all FOV data up to the point in time shown on the track-bar, as discussed above.

To begin the process, a user may open the Incident Reporting app on his/her mobile device to report an incident. After successfully submitting the incident report the user may toggle the "Live Broadcast" button (see FIG. 13). Video automatically starts streaming from the device to the backend system video streaming engines. The mobile app determines its camera field of view using the built in magnetometer and updates the reported incident in the backend system with the latest FOV and GPS data. As the user pans the mobile device to capture the incident with the device's camera, the app continues to send in updates of the device's FOV and GPS data on a configurable interval. The operator may click on the incident in the backend system user interface (i.e., incident 1550, "Fire at HQ," shown in FIG. 14) to see its details, and may click the option to view the live broadcast video and a video player may pop up on the screen showing the live video. A symbol next to the map location in the form of a circle with transmission arcs may serve to indicate that the broadcast is still on-going (i.e., that the video is still live).

Person of Interest Tracker Module;

When an incident does occur, and the App user was able to obtain either a photo or some video that includes the person responsible for the incident, they may utilize this feature to enable tracking of that person. With this module, the user can identify a specific person in a picture or video that includes more than one person. The App user may identity the person by drawing an outline around them using a stylus, or just using their finger. This module allows the user to create the initial reference files which can be sent to the system administrator, which then can also be imported into various other third party systems, including those utilized by law enforcement agencies. This feature can also be used to identify "objects" of interest, such as bags, cars, animals, etc., and may also be used to identify "areas" of interest (e.g., a particular storage unit at a self-storage center, etc.). As a result of drawing an outline around a person or an object of interest, the App may utilize an algorithm to create a unique digital signature of the person/object. The algorithm may use many factors to create the signature, including but not limited to; curvature of the suspect's spine, the person's walking gate, color contrast, aspect ratio, size, etc.

This module may also include the capability to pre-process a unique digital signature from the video stream or picture, so that it can be checked and cross referenced with databases from third party systems and matched against signatures generated by their databases for the identification of persons (or objects and/or the finding of locations). The user's mobile device, which may be referred to herein as an edge device (i.e., they act as an entry point for data), may be loaded with specific algorithms to pre-process information on the device CPU, before sending it to the main system of the administrator. This may be very advantageous when hundreds and even thousands of loads are taken care of individually on multiple edge devices before sending to the main system for additional processing.

I.D. Verification Module;

This module may include the capability of capturing pictures or data from or about individuals, and of comparing the data to data within existing internal databases or third party databases for matches. This module may be capable of taking pictures of a person, or their I.D. card, or employee badge, a bar code, a QR code, etc., and may perform optical character recognition (OCR) on the image, and may cross reference the data with the database of a third party access control system (ACS). Upon a match, in the data or a positive identification of the individual person, the system may capture the data from the ACS and send it back to the user's mobile device. A photo of a person may be analyzed by a facial recognition algorithm to compare it against a database of images.

The module may have access to certain police databases where, with special permission, access to limited information on specific individuals may be provided. The system administrator may correlate information gathered on specific individuals and utilize the information as an internal knowledge database.

In another embodiment, a Multi-Factor Access Control Module may serve to add multi-factor authentication to any physical security access control system. By harnessing Biometric and GPS capabilities of a mobile device, this module may permit a user's access privileges to unlock a facility's doors to be authenticated by more than just a simple key card. At many secure facilities, users are provided with access badges to swipe against door readers to gain entry into restricted areas. However, the problem with such access control is that anyone that has access to the badge can improperly gain access to the restricted areas. The Multi-Factor Access Control Module solves this problem by validating the identity of the user that is requesting access.

The Multi-Factor Access Control Module incorporates dynamic real-time multi-factor authentication into physical access control systems using a mobile phone application. Users can be authenticated against one or more distinguishing biological traits, including, but not limited to, use of the person's fingerprints, an iris scan, face/voice recognition, and a HW/SW signature, via the mobile application running on a smart phone or other mobile device. Verification of the biometric traits may be utilized in combination with an access code (i.e., a personal identification number or PIN). In addition, the phone's geo-location may be used to grant access to specific doors or restricted areas. The application may determine the mobile phone's location using one or more of GPS, Bluetooth Beacon, RFID, and NFC sensors built into phone. It can eliminate the need for door card readers, or it can be used in-conjunction with a door card reader to actuate the reader on demand.

Figure 24:
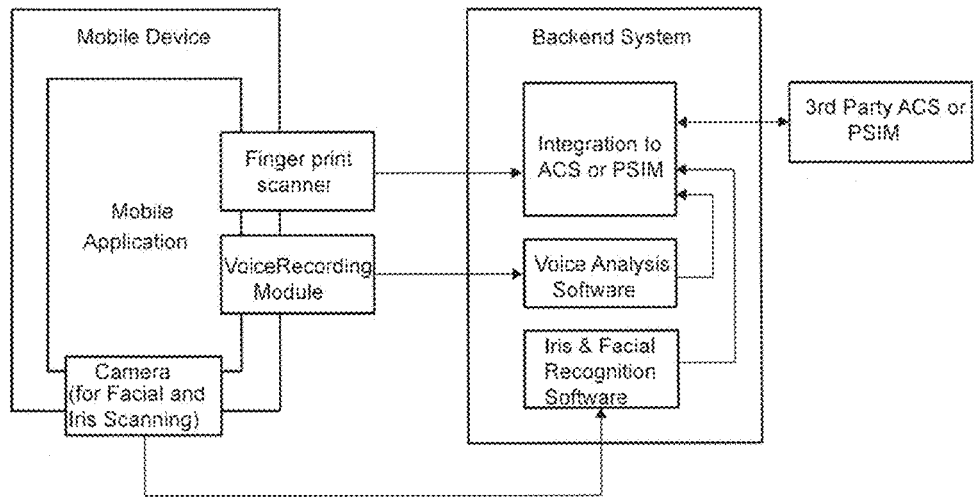
FIG. 24 is a block diagram illustrating the Multi-Factor Access Control Authentication Module architecture via the mobile device.

Many options are provided through the use of this mobile application. For example, an organization can dynamically increase security/authentication requirements for access into restricted areas, by adding more layers of validation. In addition, providing visitors with credentials and access to a secure area is made easier, and may be accomplished without having to print temporary access badges. This mobile application would also allow the organization to stay within compliance when a "visitor escort" is required since the visitor's access can be dynamically and immediately withdrawn if an "authorized escort" is not in proximity to the visitor, or does not validate the visitor's access. As illustrated schematically in FIG. 24, the architecture for the Multi-Factor Access Control Module may consist of the following:

a mobile application that includes a module for Fingerprint scanning, Iris scanning and Voice recording;
    a application that is built for multiple platforms; and
    services and storage in the backend system for voice and facial recognition processing.

Figure 25:
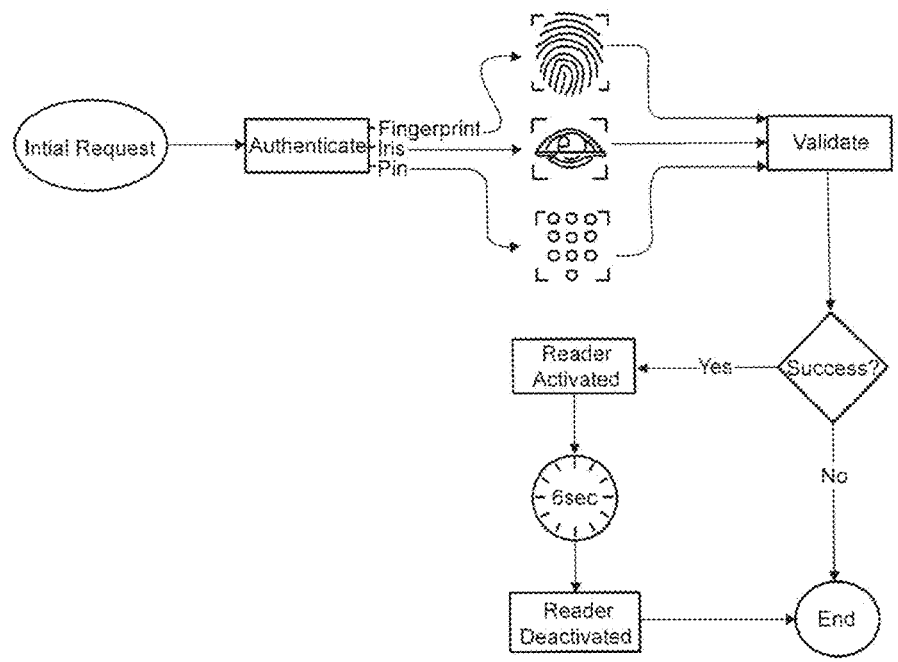
FIG. 25 schematically illustrates a process for Multi-Factor Access Control Authentication in accordance with the architecture of FIG. 24.
Figure 26:
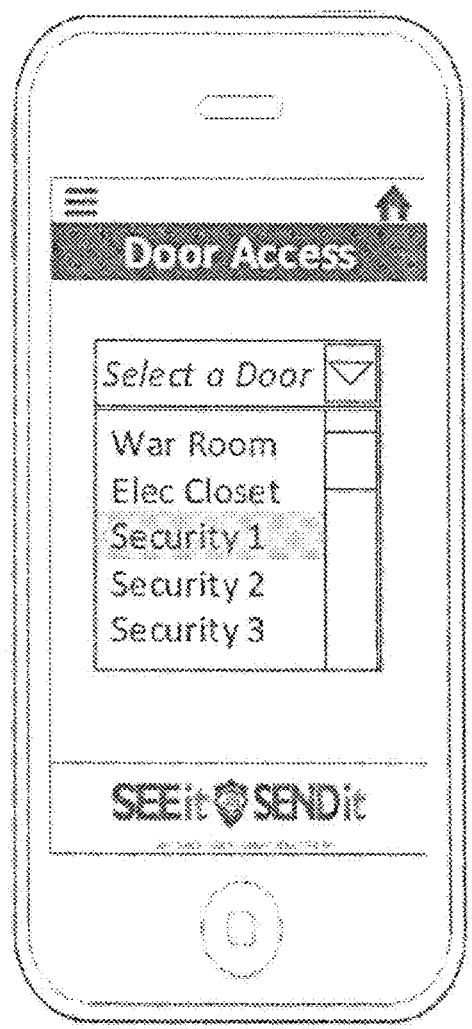
FIG. 26 illustrates a first screen shot tor the Access Control application running on a mobile device, showing a screen configured for selecting a door to be accessed.
Figure 27:
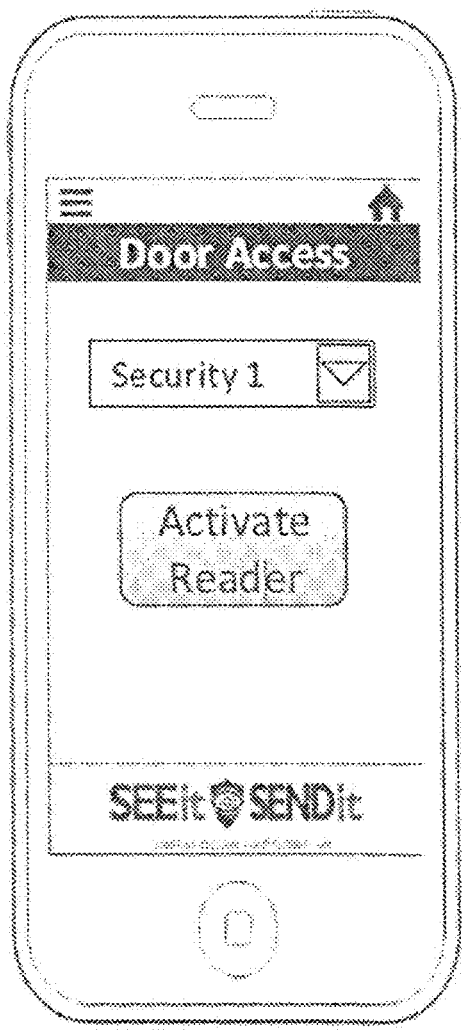
FIG. 27 illustrates a second screen shot for the Access Control application, showing a button that may be toggled to activate a door's reader, after a desired door to be accessed has been selected within the screen of FIG. 26.
Figure 28:
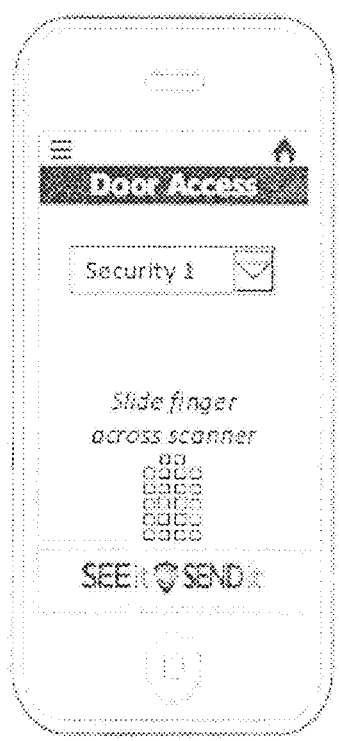
FIG. 28 illustrates a third screen shot for the Access Control application, showing a first authentication method in the form of a fingerprint reader, after the reader for the desired door to be accessed has been activated by toggling the button within the screen of FIG. 27.
Figure 29:
FIG. 29 illustrates a fourth screen shot for the Access Control application, showing a second authentication method in the form of an iris scan, after the reader for the desired door to be accessed has been activated by toggling the button within the screen of FIG. 27.
Figure 30:
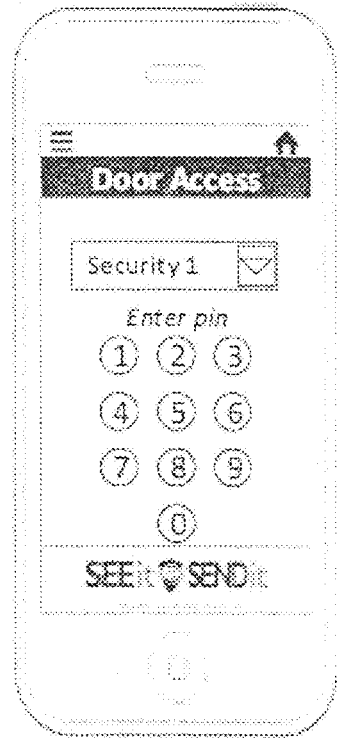
FIG. 30 illustrates a fifth screen shot for the Access Control application, showing a third authentication method in the form of a PIN number, after the reader for the desired door to be accessed has been activated by toggling the button within the screen of FIG. 27.
Figure 31:
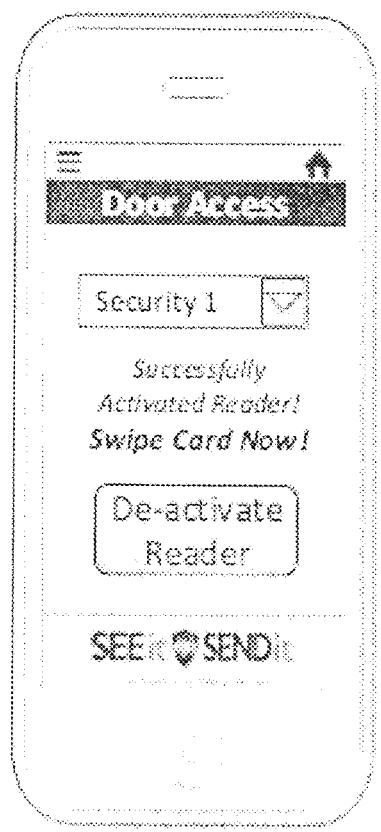
FIG. 31 illustrates a sixth screen shot for the Access Control application, indicating that the user was properly identified, and that the door reader has been activated and is ready for the user to swipe his/her access card, and furthermore showing a button that may be toggled to immediately deactivate the reader.

A flow chart depicting one embodiment of the process for using this architecture for the Multi-Factor Access Control Module is shown in FIG. 25. A facility may have the option of adding some or all or of its access control doors to be controlled by the Multi-Factor Access Control module of the See It Send It application running on the person's mobile electronic device, which may communicate via Wi-Fi or Cellular data networks through a back-end gateway to the access control system. The secure doors would be locked at all times, with the access control readers disabled so that they cannot read any user access cards/badges. When a user needs to enter through a locked door, he/she will be perform a series of steps. First, as shown in FIG. 26. the user, who may be provided access to the application by being assigned a user I.D. and a password, may select that door (e.g., the "Security 1" door) on their mobile device from a list of available doors in the vicinity, which can be auto-populated in the screen based on the user's location. After selecting the door to be unlocked and entered, the screen of FIG. 27 may next be displayed on the user's mobile device, after which the user may toggle the "Activate Reader" button displayed therein. After toggling the "Activate Reader" button, one or more required authentication methods may be presented to the user, shown in FIGS. 28, 29, and 30, which may include, but is not limited to, use of a Fingerprint Scan, use of an Iris Scan, and/or entry of the appropriate Pin Number. The user will be appropriately instructed to slide his/her finger across the scanner portion of the screen for the Fingerprint scanner, and/or to place the phone in front of his/her eye to complete an Iris scan, and/or to enter his/her Pin number into the displayed keypad. Additionally, the app may use its GPS sensor and the unique signature from the software and hardware components of the device (i.e., the MAC Address for a hardware signature or digital certificate for software signature), to confirm that the particular user's mobile device is located within a threshold distance away from the card reader of the door for which entry is requested. After confirming the user's identity and authorization to pass through the requested door, the system may send a command to the access control system (ACS) to enable the door's card reader. The mobile device may now appear as shown in FIG. 31, and may provide the user the option to immediate deactivate the reader. The user will have a pre-set amount of time, which is configurable (e.g., 5 second, 10 seconds, etc.), within which to swipe his/her card through the access control reader, for the particular door to gain access. Whether or not the user successfully swipes his/her card to unlock the door, the reader will automatically return back to its disabled state after the programmed time has elapsed. If the user did not have his/her card ready and was not timely in swiping it, the process can be repeated to again activate the reader. In the case where access is required by multiple users, the process may have to he performed by each user prior to swiping their cards at the reader. A timer may record the elapsed time for which the door remains open, and a sensor may detect whether or not more than one person actually enters through the open door.

With respect to use of the mobile application where a "visitor escort" would be required to validate the visitor's access for entry to specific doors/areas, this may be facilitated by the visitor being given a Bluetooth enabled tag that is linked to the escort's mobile device. If the visitor's Bluetooth tag loses connectivity with the escort's device, the system would recognize that they are no longer together (i.e., in sufficient proximity to each other), and the visitor's access via the application may be suspended—either temporarily (e.g., until rejoining proximity with the escort) or semi-permanently (e.g., until being given another Bluetooth enabled tag, or until the existing tag is refreshed).

Mobile Profiler to Create Composite Images:

The mobile profiler module may provide the user with the capability of creating an image to send as a representation of an individual that they are trying to describe. The mug shot sketcher portion may provide the capability of selecting facial features to create a "mug shot." The Avatar Creator portion of the module may permit creation of an avatar by selecting from a series of choices, such as male or female, shirt color, pants color, etc. The mobile profiler module may also permit collaborative creation of the avatar, as it may be shared with other App users. Thus the avatar created by one user may be modified or improved by a second App user (e.g., "the person's nose was a little bigger"), and it may also be updated by subsequent users (e.g., "now be is wearing a red jacket . . . "). This may be very useful in many different scenarios, including, for example, where a suspect robs a store and runs out past a group of people who may thereafter each individually and then collaboratively use the module to sketch an avatar that represents the suspect. Even in the situation where two or more people separately create an avatar to represent the suspect and do not thereafter collaborate, the system may utilize an algorithm to combine features of the two avatars to form a collaborative avatar. The system may also be capable of using that 3d avatar to search through video to identify anyone fitting that profile, which may be done in real-time or near real time.

Drone Assist Module:

This module offers features/functionality for utilizing drone assistance, which is particularly advantageous during live pursuit over varying geographical configurations where there crowds. The module may permit tracking via GPS & Wi-Fi, of both people and assets. Phones or mobile devices emit signals while looking for GPS or for Wi-Fi connection, even if not connecting to specific Wi-Fi. The drone can identify the particular individual by the specific signal given off by their phone, and may track them by tracking the signal. Once a suspect, asset, or other person of interest has been identified and they run into a crowd, a building, a tunnel, tree cover, etc., where it may be difficult to track them visually, the drone can still track and identify that person by the signal given off by their mobile device.

The module may also be configured to permit auto tracking using onboard video, to be capable of tracking dynamically while on the move. The module may also be able to identify and track individuals by the signal broadcast by their mobile devices to continually track with the capability to hand off to another drone, and to share the information with any other modules herein. Different hovering patterns may be selected for the drone when tracking an asset or another person.

As an example, an asset (e.g., a police officer, security guard, etc.) may be chasing a suspect on foot or in a vehicle. A drone may track and follow the chase visually from the air, and may also be sending that video to the App running on the mobile device of the asset. If the suspect disappears around a corner or takes cover somewhere, and the asset becomes uncertain of the direction the suspect went and/or the potential danger posed by the situation, he/she can look at his mobile app and watch the live video from the drone. The video may inform the asset of the direction taken by the evasive suspect, and whether the suspect may be waiting around the corner with a weapon pointed in the direction from which the asset may need to continue the pursuit. The drone may also provide the asset, through the App on his/her mobile device, a local map upon which the position of the suspect's mobile device is located.

Tracking of a user's smart phone or other mobile electronic device may be leveraged when incorporated into a drone, but such tracking may also be advantageously utilized when accomplished through the use of a hand-held scanner, and/or one or more stationary ground-based scanners. Basic technology for such tracking of search signals emitted by a mobile electronic device (e.g., Wi-Fi, GPS, Bluetooth, etc.) is known in the art (see e.g., U.S. Pat. No. 9,374,673 to Mendelson: and U.S. Patent Application Pub. No. 2012/0190386 by Anderson). In another embodiment disclosed herein, a scanner may be further configured to provide Audio Analytics and Device Detection and tracking. The scanner may be configured to identify various device types (e.g., IP addresses, MAC addresses, etc.). The scanner may therefore scan the area around it for all Bluetooth or Wi-Fi enabled devices, and may collect the address of each device (device type and name), using an algorithm. Using the characteristics of the signal emitted from the device from repeated scans (e.g., received signal strength—RSSI: time of arrival—TOA: and/or angle of arrival—AOA), and a rate of change in signal strength for each device, the scanner can determine, with some accuracy, the distance of the device from the scanner, which is illustrated schematically in FIG.

33. By tracking the change in RSSI of the device and Aspect Ratio of the person, the system can tie the two together within some statistical accuracy. Since the scanner can determine its own geographical location (e.g., using GPS), it can also make an estimate of the device's geographical location. Combining these attributes, the scanner may obtain a picture of what devices may be located within a specific area around the scanner's location.

One or more microphones may be added to the scanner and may be used to identify sounds and sound fluctuations in real-time (recordings of the sounds may, but need not be, acquired). Audio analytics software on the scanner may be configured to detect specific sounds (i.e., gunshots) or sudden fluctuations in sounds received by the microphone (i.e., the start of a fight/aggression), to identify an incident and its location. If an event is detected, the scanner may forward the details of the event to the backend system. The detection of an event may also be used to trigger the scanner to scan to identify the electronic devices, and the locations of the devices, as described herein. Once the scanner has identified the location of each of the devices surrounding the scanner, and has detected any events from the audio received by the microphone, it can correlate each of the devices to each of the events. The scanner thus combines event identification via sound detection, and device geolocation detection, to provide a backend operator a clear picture of the different devices that are in the vicinity of an aggression event, as illustrated within FIG. 34, and may tie the event to a particular mobile electronic device, if there is a second event, and if the same mobile device ID is identified and associated with the new event, the system can determine the suspect's location, and that he/she is traveling in a certain direction. In another example, if an active shooter is detected by a scanner on the first floor of a building, a list of mobile devices is captured immediately upon the occurrence of the event. If the shooter then moves to the second floor and a shot is detected, a new set of device IDs are captured by a second scanner at that location. By comparing the two lists the system can determine and/or corroborate that the device ID common to both event locations most likely belongs to the suspect. The suspect's device ID may now be placed on a blacklist, either being manually or automatically blacklisted. If the suspect then moves to the fifth floor, even if is no shot or other incident is detected, another scanner on that floor may identify the suspect's device, and presence thereat, since all of the scanners may be coupled to cooperate and be constantly tracing all of the devices within their respective ranges, and may be alerted to the device(s) on the blacklist. A particular building or an entire secure facility may be outfitted with a plurality of such scanners to eliminate any blind spots, so that each of the mobile electronic devices can be traced at all locations within the building/facility. This functionality, including the blacklist for the mobile device associated with a suspect relating to a detected incident, may operate in combination with the herein described access control system. Once a mobile electronic device of a person is associated with an incident and paced on the blacklist, his/her device may immediately have the access privileges revoke. Thus, if the suspect exits one room/area and attempts to migrate into another secure room/area through a secure door, he or she would be denied admittance.

Figure 32:
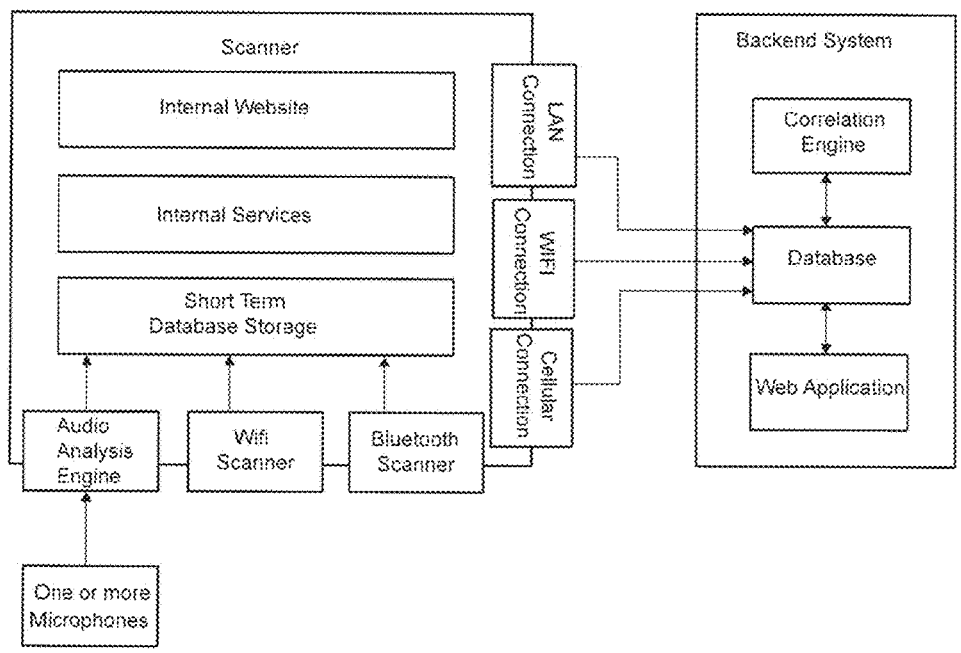
FIG. 32 is a block diagram illustrating architecture for Audio Analytics and Device Detection and tracking via Che mobile device.
Figure 33:
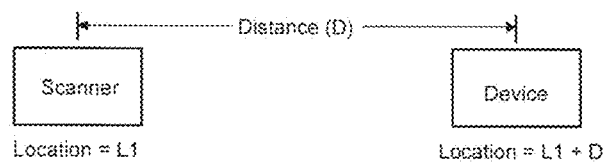
FIG. 33 is a schematic illustration of the separation distance between the scanner and the device to be detected and tracked.
Figure 34:
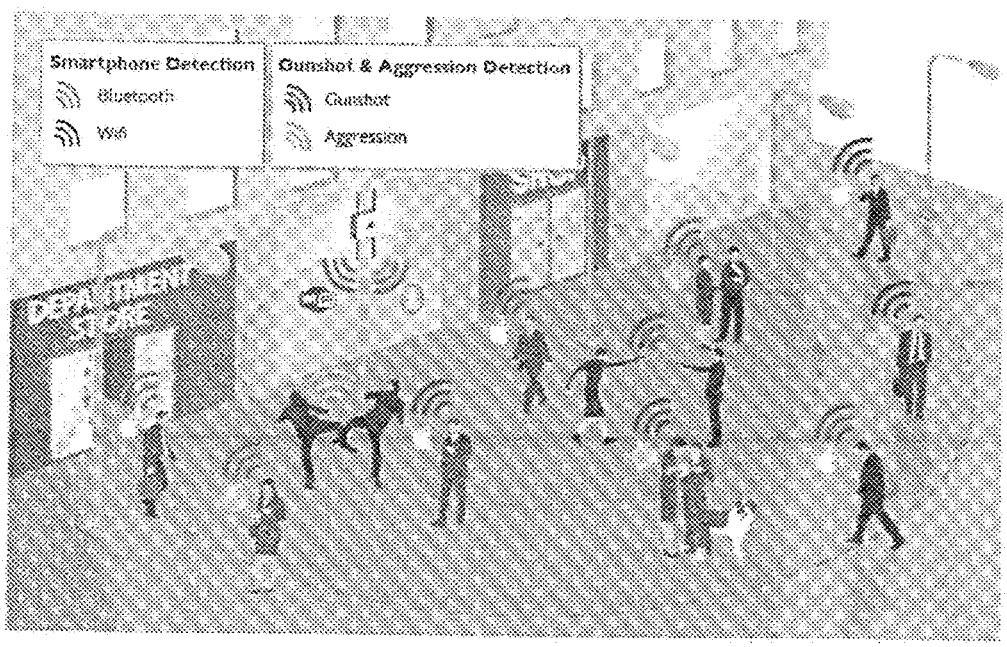
FIG. 34 illustrates correlating the locations of detected devices and the location of events identified with the audio analytics obtained using the architecture of FIG. 32.

As shown in FIG. 34, the signal presence of an Apple device may be symbolically represented on the map image, as may the presence of a PC signal, along with a gun image/symbol at the location of a gunshot or shots, and a symbolic representation of an aggression incident (i.e., individuals engaged in a fight/scuffle). Concentric circles centered on the scanner's position may be shown on the map image, which circles may be formed with radial distances representative of a distance from the scanner of a detected mobile device, and/or a detected incident. A circle may also be positioned thereon to provide a rough indication of the maximum scanning range of the scanner. The data may be made available via a web application and web API (application programming interface) to be used for forensic or searching applications. As illustrated in FIG. 32, the architecture used tor the Audio Analytics and Device Detection and tracking may include the following:

a Bluetooth and Wi-Fi Scanner;
    one or more microphones; and
    an Audio Analytics engine.

Figure 35:
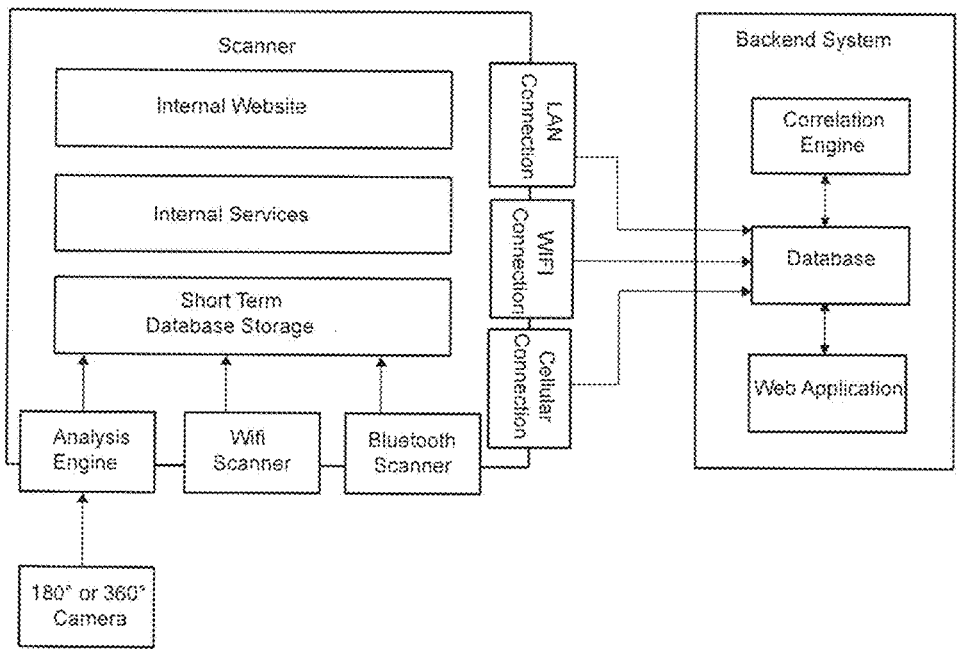
FIG. 35 is a block diagram illustrating architecture for Device-to-Person Association using Video Analytics and Signal Strength via the mobile device.

Another embodiment, may be directed to a Device-to-Person Association via Video Analytics and Signal Strength. In this embodiment, the scanner may be configured to identify various electronic devices that use Wi-Fi, Bluetooth or Cellular types of technologies, and may scan an area for all devices and may collect unique identifiers for each device. Additional data available from the scanner may again include device location, type, name and signal strength. In this embodiment a camera being integral to, or separate from, the scanner may be configured to image 180 degrees or 360 degrees, and may be used to identify people. The camera may utilize video analytics and changes in a person's aspect ratio to determine the rate of change of an individual's location in reference to the position of the scanner. The scanner may also track the rate of change in signal strength for each device detected to determine changes in the devices' locations in relation to the scanner. By comparing the rate of change in a person's location in relation to the scanner, and the rate of change in the position of each device in reference to the scanner, the scanned devices can be paired to the image people. The process may be performed iteratively to filter out false positives when multiple people or devices are detected in close proximity. As illustrated in FIG. 35, the architecture used for the Device-to-Person Association via Video Analytics and Signal Strength may include the following components:

a Bluetooth and Wi-Fi Scanner with Analytics Engine to detect rate changes;
    a 180 or 360 degree camera; and
    a Correlation Engine to pair devices to people.

During the process the scanner may scan the area around it for various Bluetooth, Wi-Fi, or Cellular type of technologies. Although the signal strength may be received and detected for each device, it would be difficult to determine the distance of a device with sufficient accuracy using only its signal strength, given that different devices may ordinarily have different signal strengths, which may be compounded when multiple people/devices are located in close proximity to each other, such as in a crowded train station during rush hour. The scanner may keep track of the different signal strength readings of a device, as it moves, moving closer to or further away from the scanner. The rate in change of the signal strength may be determined, and mas also be recorded. The tracked signals may be correlated with the rate in change in aspect ratio of the imaged people. Additionally, or alternatively, the recorded rate in change of the signal strength for each detected device mas be correlated with other detected rates from one or more additional scanners. The direction of movement may also be determined and used in the pairing process.

Figure 36:
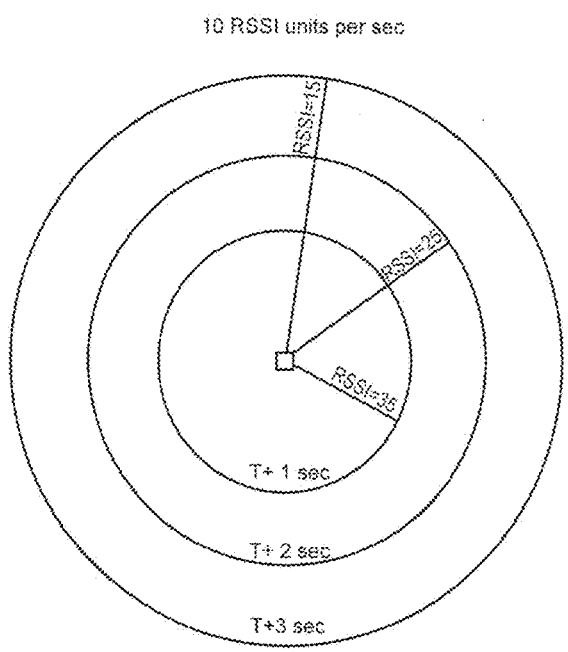
FIG. 36 illustrates graphically how a change in signal strength can be determined based on time, to assist in tracking a mobile electronic device.

FIG. 36 illustrates how a change in signal strength can be determined based on time, to assist in tracking a mobile electronic device. FIG. 36 shows three samples taken at one second intervals. In each sample the signal strength increased by 10 units, indicating that the device is moving at a rate of 10 units per second, and also that the device is moving away from the scanner.

Figure 37:
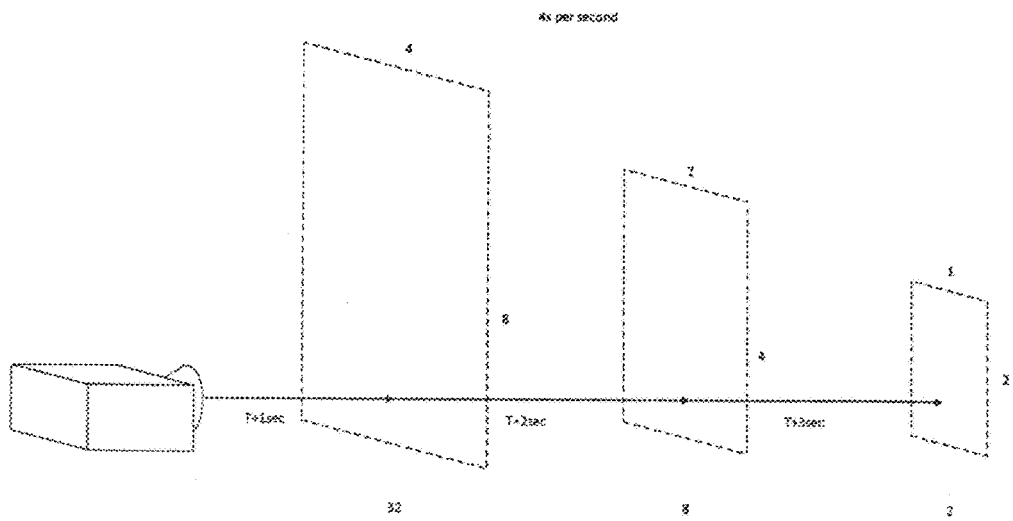
FIG. 37 illustrates how a change in the aspect ratio of an imaged person can be tracked based on time, to assist in trucking the person.

Video analytics may be used to differentiate people from other objects. As an imaged person moves closer to or further away from the camera, their aspect ratio changes. This rate of change in aspect ratio can be correlated with the rate of change in signal strength to determine which devices are moving together with (i.e., being carried by) which person. FIG. 37 illustrates how the change in the aspect ratio of an imaged person can be monitored over time, to assist in tracking the person. FIG. 37 shows three image samples taken at one second intervals. In each sample the signal strength increased by 4 times its previous size, indicating that the device is moving at a rate of 4× per second and that the device is moving away from the camera. The camera may also take a snapshot of the person's face or body, and may forward it to the backend system along with the calculated rate changes, position data. etc.

Correlation between the rate of change of a device's signal strength and a person's change in aspect ratio, using one or more scanners, may allow the system to provide a good estimate of which people are carrying particular mobile electronic devices. The correlation engine may use multiple parameters, including, but not limited to, color, aspect ratio, texture, body profile, gait, etc., to determine the signature of person to correlate between multiple samples from the scanner, and/or samples from other nearby scanners.

The process may be performed iteratively to filter out false positives when multiple people are detected with multiple devices moving in a similar direction. A statistical analysis may be performed to estimate the closest matches. The data may then be made available via a web application and web API (application programming interface) to be used for forensic or searching applications.

Figure 38:
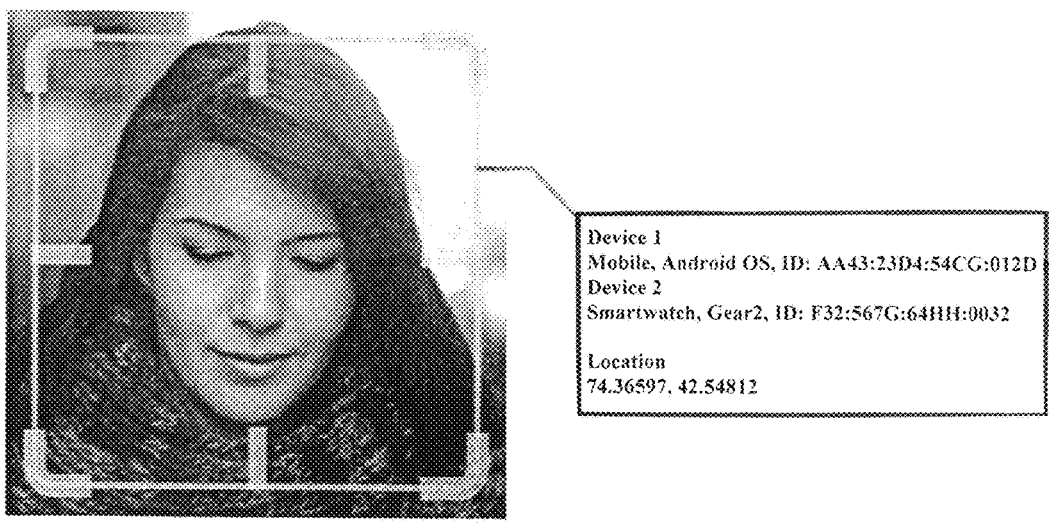
FIG. 38 illustrates correlating an imaged person with a detected mobile electronic device, based on position data and other characteristics, in accordance with the architecture of FIG. 35.

The imagery from the camera and the stream of other data from the scanner (e.g., a mobile electronic device correlated with an imaged person and position data, as shown in FIG. 38) may be provided to the backend system, and may also be overlaid on a map image, or may be further interrelated wherever possible. The data so processed and received by the application's backend system may be made available to related operators, agencies, and/or other consumers.

Accessibility of Functionality Using Google Glass:

The user's mobile App may be coded to be capable of being utilized with Google Glass. The user may therefore have the capability to scan and search using the Google Glass technology, and obtain photographic images, which may be used in conjunction with the above described modules of the "See It Send If" platform to process the images and obtain live data. Real time guidance may be provided to the user to access the functionality of the "See it Send it" mobile platform using their Google Glass. The Google Glass may be used for controlling and uploading pictures and video. A dashboard capability may be provided to guide the user through the functionality in Google Glass. The dashboard may permit selection of a fixed camera to be monitored by the user, and may also permit selection of a pan/tilt/zoom (PTZ) camera configured to follow IR pulse emissions. The dashboard may also permit selecting of live drone feed video in theater while in pursuit of person of interest, as well as the scrolling of bulletins to users while on the go.

Wearable Devices;

The App of the present invention may be configured to coordinate with certain wearable devices that may communicate critical data through the mobile App to the control center of the administrator. One wearable device may be a security vest that may be able to transmit vital signs and impact data through the mobile App to the administrator.

Bail Check-In Module:

This module is intended for the bail bond industry and allows for periodic check in. This module may provide an opt-in feature where bail is given with the condition that the suspect uses the application to check in as required. The module may also be used for where a prisoner is released on parole, and that parolee is required to routinely check in with a parole office. The terms "suspect" and "parolee" are therefore intended to be used interchangeably herein. The key features of the module are:

User Check-In Screen—This aspect of the module is configured for scheduled check-ins. and an automatic alert generated to remind the suspect to check in as required. The module also provides for triggering a random check in by the suspect. When the suspect responds to the alert and performs the required response or entry of information, the suspect's GPS location may also be sent back to system.

Authentication—This aspect of the mobile app may be configured to authenticate the identity of the suspect/parolee using one of several different methodologies, i.e., Random security questions, voice pattern recognition based on randomly generated phrases, fingerprint identification, an iris scan, a retina scan, a facial scan, blood type, or any other biometric signature that is an available feature of the device.

Stealth Tracking—This aspect of the module is configured to inform the bail bond company as to the location of the suspect, using either a random ping to the mobile device, or a periodically timed ping. This feature may be put into effect when a bail applicant opts in to the program during his or her bail application. If the suspect violates the terms and conditions set by the bail requirements, an SMS message is sent to the subject, and the GPS location of the suspect will immediately be sent during the interaction to the bail bond company.

Auto Ping—This aspect of the module is configured to automatically ping the mobile device to obtain its location, without any end user intervention, to ensure that the app is online and functioning properly, and that it has not been deactivated.

Geofencing Screen—This aspect of the module may provide an on-screen map image of die region surrounding the suspect, which may include a customized geographic perimeter within which the suspect is required to remain, in order to ensure that the terms and policies of bail are being adhered to. It may also include one or more pre-defined restricted zones therein, into which the suspect parolee is prohibited from entering, such as a school zone, etc.

Call Recording—This aspect of the module may provide the capability to record inbound and outbound calls made with the device if the suspect/parolee is in violation of the bail condition.

Bracelet Pairing—This aspect of the module may provide the capability to functionally pair auxiliary devices to the mobile phone using Bluetooth or Wi-Fi. Suitable auxiliary devices may include a leg or wrist security bracelet. Once paired, the authentication mechanism will utilize the pairing with the auxiliary device secured to the suspect, to ensure that the suspect is physically located in acceptable proximity to the mobile device.

Landline Caller ID Using Access Code—This aspect of the module may provide additional verification of the suspect/parolee location by messaging the person to call a dial back number using a land line. The system may verify the land line location through the phone carrier to further validate the suspect's current location, by corroborating that the landline and the mobile device are co-located.

Authentication—This aspect of the module may provide authentication of the identity of the parolee using multiple methodologies, i.e., random security questions, finger print using sensor on smart-phone, iris scan, retina scan using a camera on the phone, or voice pattern recognition based on randomly generated phrases.

Backend Engine:

A software back end engine in the cloud ingesting data from all the edge devices may be provided. Data captured or created by the user may be stored on and pre-processed by his/her mobile device, by the software of a Mobile Engine installed and running thereon. The information and/or attachments may then be sent via wireless communication through a network into the Backend Engine which has processing power and storage via servers and databases within its infrastructure. The information submitted may be processed further and stored. The Backend Engine may be dynamic with load balancers, automatic provisioning, shading, and clustering for additional capacity. The Backend Engine may then send information back to the mobile device's Mobile Engine where additional commands can be executed or data gathered and sent back to the Backend engine. This iterative process may repeat multiple times while executing commands and working within an infrastructure consisting of the Backend Engine, one or more Mobile Engines, and mobile device users as well as external and internal databases and data stores.

Filtering and processing functions may be programmed, including but not limited to: Video, Audio, Text, and Correlation. The back end engine, which may also include a Geospatial CHS engine, may connect to third party databases and third party systems such as Google etc. The backend engine may also be configured to do auto-stitching of video and pictures on a geographical interface. The back end engine may also include the following:

Search Analytics—The backend engine may have the capability to process information in real time using video analytics to identify items including but not limited to:

Color—i.e., finding people wearing blue jackets and black pants:

Vehicles—by license plate number or specific car colors;

Location—filter search by geographical location;

Key words—text analysis such as "suspicious bag"

Facial Recognition—By matching facial signature and or facial features in a database in comparison to what is being uploaded.

Geo Fencing—The backend engine may have the capability to dynamically and in real time create and section off a zone on a map, and provide and alert if someone, or some type of incident, is inside or outside of the boundaries. The engine is configured to create rules around zones for the occurrence of such incidences.

Situator Interface—the engine may accommodate bidirectional communication and interface into Nice Situator PSIM system (Physical Security Information Management, by TM Group Technology Management), i.e., sending audio, video, pictures and incident information into a Nice Situator and vice versa. The engine may also push information from the Situator to the mobile app users.

Altitude Calculation—The backend engine may also have the functionality to track and locate a person using latitude and longitude coordinates, and also altitude. The back end engine may operate to calibrate the detected altitude with the floor number of a particular building, i.e., it may locate a person, giving the street address, building number, and the floor number.

Multi-Functional Pre-Processing Information Module;

This module may provide Application and software intelligence running on the mobile device that may be used for pre-processing of both structured and unstructured information, i.e., video, audio, text. Some features of this module include, but are not limited to, the following:

Dual Encoding—The mobile engine may be able to take video and audio that was captured to store high resolution copy, and encode and transcode the video to a high efficiency format so that the data can be uploaded in the most efficient manner, as quickly as possible using the minimal amount of resource, especially bandwidth, and in an automatic fashion. The back end engine may collaborate with the mobile engine to select the most efficient stream available for uploading (i.e., Jpg. mjpg. mpg4. h.263. h.264. h.265. etc.). The encoding/transcoding can optimize the video data by 2 methodologies:

1) Frame rate dilution, i.e., 30 fps to 15 fps to 7 fps to 3 fps to 1 fps.

2) Resolution drop, i.e., 2 mp to 1 mp to 4 cif to 2D to CIF.

Edge Analytics—Pre-Processing using the edge device CPU with specific algorithms is also provided. The user's mobile device, also referred to as the edge device, can be loaded with specific algorithms to pre-process information on the device CPU before sending it to the main system. Examples include video analytics, facial recognition, audio analytics and text to speech and speech to text.

Smart Transmission—Smart transmission gives the functionality to start pre-uploading images and other data into a temporary file on the server until the send command is executed. Smart transmission may also include sending low resolution files quickly, and the higher resolution files as a follow up, or when bandwidth availability allows. The application may send data using Wi-Fi, cellular, or other network connectivity available, or any combination of available connections.

Authentication Biometrics—the pre-processing information module may process biometric data, including, but is not limited to, fingerprints, iris scans, retina scans, facial scans, a blood type, or any other biometric signature, using the features available of the particular mobile device.

Voice—the pre-processing information module may perform voice pattern recognition and voice matching for authentication using predetermined phrases or random phrases. This feature may also be used to pre-process data stored on any recorded voices.

Unique Personal Data—the pre-processing information module may provide an automatic list of questions from a library of pre-populated personal questions.

POI, Object, or Area Search on Video/Pictures—using this capability of the pre-processing information module, the user can identify a specific POI (Person Of Interest) or an object in a picture or video, and select the person/object by drawing an ellipse or square or any other specific outline around them. This feature may allow the user to create the initial reference files that can be sent to the main system, which then can also be imported into various other third party systems. This feature can also be used to identify "objects" of interest such as bags, cars, animals, as well as outline "areas" of interest.

Data Destruction—the pre-processing information module may provide the capability to delete data after being viewed and once the parameters are met. An additional option may be provided to multiple over-write upon the sectors that the data was originally written upon. There may also be an option to do a delete and multiple overwrite at both the source and destination.

Data Authentication—the pre-processing information module may be configured to authenticate that the data sent from a specific mobile device was actually sent from that particular mobile device. A unique watermark may be generated based on the device serial number and ID. This feature may also provide for maintaining the chain of custody of the data. The preprocessing module may upload a logged in user ID and a device ID (which may vary depending on the device), as metadata for each attachment submitted with a report. The metadata and attachment (image, video, and/or document) will then be digitally signed for verification that the attachment has not been altered since the upload. The watermark may include the User ID and the Device ID, along with a stamp verifying the digital signature and date of verification, as shown within FIG. 20. A 3rd party digital signature provider may also be used. Additionally, the modules herein may generate a report as a "snapshot" of an incident that will include all current incident information and attachments. At the time of the report generation the system may also digitally sign the report document for later verification that it has not been altered.

Secure Transmission—The mobile engine may be configured to send information in an encrypted and secure manner to the back end engine and associated cloud.

Fan Experience Module:

This module may provide information for fans attending an event at a stadium, and may also provide security information to keep them aware and safe while approaching and in attendance at the venue. Some features of this module include, but are not limited to, the following:

Parking assist/Parking Lot Section—This aspect of the module may provide the user with up-to-date information as to where parking spaces are still available. Moreover, once the person finds and parks in an available parking spot, the App may identify and store the location of their parked car, so that it may provide direction after the event to help the person later find his/her way back to their car.

Best Queue—This aspect of the module may tell the fan where to enter the stadium for the shortest queue, and may give directions based on a current position and crowd conditions (e.g., "Entry at lane F—walk forward 450 feet and turn right . . . ").

Seat Find—This aspect of the module may tell the fan the best was to proceed to their seat, based on a current position and crowd conditions Social media alerts—This aspect of the module may provide the fans with alerts based on social media postings, which may want the fan that some hazardous/dangerous activity may be going on, to warn them to move away from or to avoid a specific section (e.g., "fight breaking out in Section C . . . ," or "ice being thrown on steps between Sections E and F," etc.).

Got-to-Pee—This aspect of the module may provide the fan with directions to the nearest bathroom, based on a current position and crowd conditions, and may also evaluate and appraise the user of congestion/wait times.

Concession Stand/Beer Stand/Kiosk—This aspect of the module may provide the fan with directions to the nearest Concession Stand/Beer Stand/Kiosk, based on a current position and crowd conditions, and may also evaluate and appraise the user of congestion/wait times.

Vendor Request—Asks what is needed: requested and based on section . . . takes collective consensus—sends vendors with the right mix and ratios (e.g., beer soda, Chips/Popcorn, etc.).

Food Order—This aspect of the module may provide a full menu of food items available so that the fan can utilize one of the following:

ReadyOrder—submits the food order so that the selections may be prepared and ready when they go to pick it up and pay at the kiosk/window.

FullServ—permits the fan to pay for the food order online and have the order delivered directly to their seat.

Jumbotron Submit—This aspect of the module may permit the fan to submit pictures (e.g., settles) and/or video so that it may be displayed upon the jumbotron in the stadium.

Sell Time/Auction Time—This aspect of the module may permit the fan to pay for or bid on a segment of time, during which their picture or video submission would be displayed on the jumbotron.

Game Interact—This aspect of the module may permit the fan to pay for or bid on a segment of time, during which they may launch interactive games on the jumbotron/win video position, etc.

VIP Access—This aspect of the module may permit the fan to receive internal communications from the organization that may be hosting the event at the stadium (e.g., the NFL/NBA/MLB, etc.), such as dugout pictures, microphone feeds, player pictures, etc.

Entry Exit—This aspect of the module may help the fan to find the best or quickest exit out of the venue, and may provide directions based on a current position and crowd conditions.

Emergency Exit—Gives emergency evacuation information and directions based on a current position and crowd/safety conditions.

Panic—may include the same functionality as the main app but is embedded into the fan experience module.

Incident Reporting—may include the same functionality as the main app but is embedded into the fan experience module.

Figure 10:
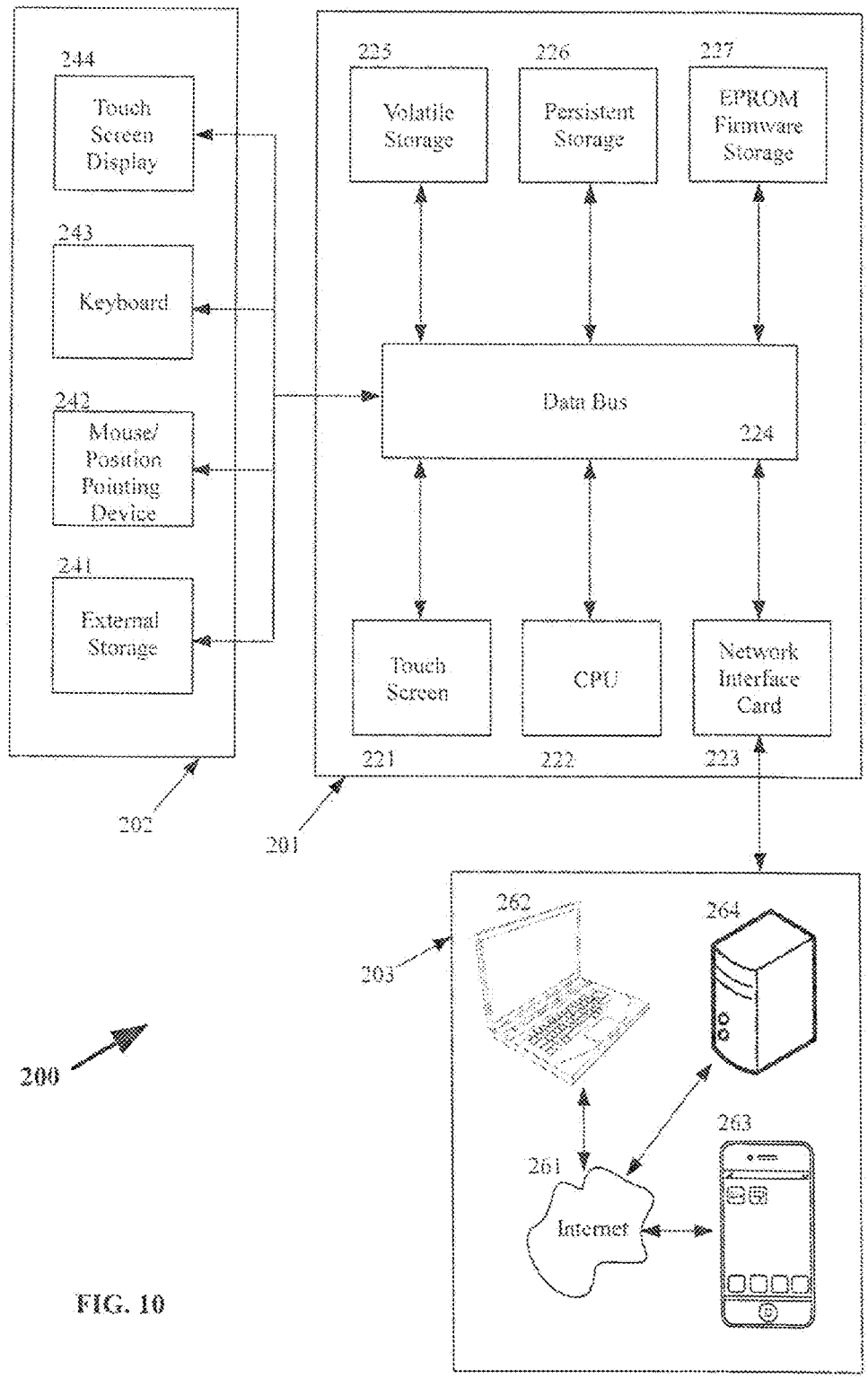
FIG. 10 is a schematic illustration showing an exemplary computing unit capable of being programmed by the instructions of the software of the present invention, and which may include cellular phones, personal computers, and other mobile smart devices.

Software of the present invention may run on a suitable computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 10, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of computer-readable media include, tor example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

We claim:

1. A computer-implemented method comprising:
configuring a plurality of client devices for continuously transmitting its respective geographic location wirelessly over a network to a server;
configuring the server for continuously monitoring the geographic location of each of the client devices;
configuring each of the plurality of client devices for selectively transmitting an alert from the respective device to the server;
configuring the server for identifying when one of said client devices is transmitting the alert;
configuring the server for transmitting a message to a selective one or more of said plurality of client devices being in proximity to the one client device transmitting the alert.

2. The computer-implemented method according to claim 1, further comprising:
configuring the server to notify emergency medical responders when the one client devices transmits an alert for a medical emergency;
configuring the server for to call and transmit a prerecorded voice message to each of said plurality of client devices being in proximity to the one client device of the user requiring assistance; and
configuring the server for providing respective directions for each of the client devices in said proximity to the one client device of the user requiring medical assistance, to respectively proceed to the one user requiring medical assistance.

* * * * *